United States Patent
Zhang

(10) Patent No.: US 11,196,638 B2
(45) Date of Patent: Dec. 7, 2021

(54) NETWORK EVENT PREDICTION METHOD AND APPARATUS AND METHOD AND APPARATUS FOR ESTABLISHING NETWORK-EVENT PREDICTION MODEL

(71) Applicant: Huawei Technologies Co., Ltd., Shenzhen (CN)

(72) Inventor: Jianfeng Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 838 days.

(21) Appl. No.: 15/972,512

(22) Filed: May 7, 2018

(65) Prior Publication Data

US 2018/0255470 A1    Sep. 6, 2018

Related U.S. Application Data

(63) Continuation of application No. PCT/CN2016/101852, filed on Oct. 12, 2016.

(30) Foreign Application Priority Data

Nov. 5, 2015 (CN) .......................... 201510745659.4

(51) Int. Cl.
*H04L 12/24* (2006.01)
*H04W 24/04* (2009.01)
*H04W 24/08* (2009.01)

(52) U.S. Cl.
CPC .......... *H04L 41/147* (2013.01); *H04L 41/142* (2013.01); *H04L 41/145* (2013.01); *H04W 24/04* (2013.01); *H04W 24/08* (2013.01)

(58) Field of Classification Search
CPC ..... H04L 41/142–147; H04L 41/14–20; H04L 43/00–50
See application file for complete search history.

(56) References Cited

U.S. PATENT DOCUMENTS 6,970,560 B1 * 11/2005 Hench ................... H04L 5/0046
375/254
7,346,471 B2    3/2008 Chickering et al.
(Continued)

FOREIGN PATENT DOCUMENTS

CN         1770699 A    5/2006
CN       101442762 A    5/2009
(Continued)

OTHER PUBLICATIONS

Foreign Communication From a Counterpart Application, European Application No. 16861422.0, Extended European Search Report dated Jul. 17, 2018, 6 pages.
(Continued)

*Primary Examiner* — Gennadiy Tsvey
(74) *Attorney, Agent, or Firm* — Conley Rose, P.C.

(57) ABSTRACT

A method includes determining signaling sequence data of a user according to signaling plane data of the user, the signaling plane data of the user includes N pieces of signaling data and a timestamp of each of the N pieces of signaling data, and each of the N pieces of signaling data includes a signaling type, determining a first probability value of occurrence of a first network event according to the signaling sequence data of the user and a first supervised prediction model, determining a second probability value of occurrence of the first network event according to expert feature data of the user and a second supervised prediction model, the expert feature data of the user represents a value of at least one preset feature of the user, and determining a predicted occurrence probability of the first network event according to the first probability value and the second probability value.

20 Claims, 8 Drawing Sheets

(56) References Cited

U.S. PATENT DOCUMENTS

| | | | |
|---|---|---|---|
| 8,595,176 B2* | 11/2013 | Wang | H04L 41/147 706/52 |
| 9,727,882 B1* | 8/2017 | Huntwork | H04L 43/0876 |
| 9,870,534 B1* | 1/2018 | Wu | H04L 41/147 |
| 9,973,392 B2* | 5/2018 | Jain | H04L 41/145 |
| 2002/0152185 A1* | 10/2002 | Satish Jamadagni | H04L 41/16 706/1 |
| 2009/0187795 A1* | 7/2009 | Doverspike | H04L 43/0823 714/43 |
| 2010/0015926 A1* | 1/2010 | Luff | H04L 41/0686 455/67.13 |
| 2013/0311626 A1* | 11/2013 | Karthikeyan | H04L 41/147 709/221 |
| 2015/0195192 A1* | 7/2015 | Vasseur | G06F 11/2007 714/47.3 |
| 2015/0317197 A1* | 11/2015 | Blair | H04L 41/147 714/47.3 |
| 2016/0036636 A1* | 2/2016 | Erickson | H04L 41/145 370/248 |
| 2016/0105308 A1* | 4/2016 | Dutt | H04L 41/083 709/221 |
| 2016/0219078 A1* | 7/2016 | Porras | H04L 41/12 |
| 2016/0337200 A1* | 11/2016 | Wei | H04L 41/145 |
| 2016/0352606 A1* | 12/2016 | Rodbro | H04L 41/145 |
| 2016/0373306 A1* | 12/2016 | Saha | H04L 41/06 |
| 2017/0054605 A1* | 2/2017 | Duncan | H04L 41/145 |
| 2017/0346701 A1* | 11/2017 | Perrett | H04L 41/145 |

FOREIGN PATENT DOCUMENTS

| | | |
|---|---|---|
| CN | 101651568 A | 2/2010 |
| CN | 103985055 A | 8/2014 |
| CN | 104052612 A | 9/2014 |
| CN | 104113869 A | 10/2014 |
| CN | 104836781 A | 8/2015 |
| WO | 2014056318 A1 | 4/2014 |
| WO | 2015077917 A1 | 6/2015 |

OTHER PUBLICATIONS

Machine Translation and Abstract of Chinese Publication No. CN1770699, May 10, 2006, 8 pages.

Machine Translation and Abstract of Chinese Publication No. CN103985055, Aug. 13, 2014, 36 pages.

Machine Translation and Abstract of Chinese Publication No. CN104836781, Aug. 12, 2015, 27 pages.

Foreign Communication From a Counterpart Application, Chinese Application No. 201510745659.4, Chinese Office Action dated Mar. 27, 2019, 4 pages.

Foreign Communication From a Counterpart Application, Chinese Application No. 201510745659.4, Chinese Search Report dated Mar. 18, 2019, 3 pages.

Machine Translation and Abstract of Chinese Publication No. CN101442762, May 27, 2009, 17 pages.

Machine Translation and Abstract of Chinese Publication No. CN101651568, Feb. 17, 2010, 8 pages.

Machine Translation and Abstract of Chinese Publication No. CN104052612, Sep. 17, 2014, 13 pages.

Machine Translation and Abstract of Chinese Publication No. CN104113869, Oct. 22, 2014, 12 pages.

Machine Translation and Abstract of International Publication No. WO2014056318, Apr. 17, 2014, 23 pages.

Foreign Communication From a Counterpart Application, PCT Application No. PCT/CN2016/101852, English Translation of International Search Report dated Jan. 5, 2017, 2 pages.

Foreign Communication From a Counterpart Application, PCT Application No. PCT/CN2016/101852, English Translation of Written Opinion dated Jan. 5, 2017, 5 pages.

* cited by examiner

600

```
┌─────────────────────────────────────────────────────────────┐
│ Determine signaling sequence data of each first sample user │
│ according to signaling plane data and first label           │
│ information of each of multiple first sample users, where   │
│ the signaling plane data of each first sample user          │
│ includes N pieces of signaling data and a timestamp of      │  S610
│ each of the N pieces of signaling data, each of the N       │
│ pieces of signaling data includes a signaling type, the     │
│ first label information of each first sample user is used   │
│ to represent whether a first network event of each first    │
│ sample user actually occurs, and N is a positive integer    │
│ greater than or equal to 1                                  │
└─────────────────────────────────────────────────────────────┘
```

Determine signaling sequence data of each first sample user according to signaling plane data and first label information of each of multiple first sample users, where the signaling plane data of each first sample user includes N pieces of signaling data and a timestamp of each of the N pieces of signaling data, each of the N pieces of signaling data includes a signaling type, the first label information of each first sample user is used to represent whether a first network event of each first sample user actually occurs, and N is a positive integer greater than or equal to 1 — S610

Train a first supervised prediction model according to the signaling sequence data and the first label information of each first sample user, where the first supervised prediction model represents a mapping relationship between the signaling sequence data of each first sample user and a probability value of occurrence of the first network event — S620

Train a second supervised prediction model according to expert feature data and second label information of each of multiple second sample users, where the expert feature data of each second sample user represents a value of at least one preset feature of each second sample user, the second supervised prediction model represents a mapping relationship between the expert feature data of each second sample user and the probability value of occurrence of the first network event, and the second label information of each second sample user is used to represent whether the first network event of each second sample user actually occurs — S630

Determine a first network-event prediction model according to the first supervised prediction model and the second supervised prediction model, where the first network-event prediction model is used to determine a predicted occurrence probability of the first network event — S640

FIG. 6

NETWORK EVENT PREDICTION METHOD AND APPARATUS AND METHOD AND APPARATUS FOR ESTABLISHING NETWORK-EVENT PREDICTION MODEL

CROSS-REFERENCE TO RELATED APPLICATIONS

This application is a continuation of International patent Application No. PCT/CN2016/101852 filed on Oct. 12, 2016, which claims priority to Chinese Patent Application No. 201510745659.4 filed on Nov. 5, 2015. The disclosures of the aforementioned applications are hereby incorporated by reference in their entireties.

TECHNICAL FIELD

The present disclosure relates to the field of operation and maintenance for network quality, and in particular, to a network event prediction method and apparatus and a method and an apparatus for establishing a network-event prediction model in the communications field.

BACKGROUND

As people's requirements keep growing and communications technologies develop, a modern communications network includes a larger quantity of network element devices. As a result, performance of the communications network may be affected by factors in multiple aspects such as conditions of natural environments, interference of ambient signals, civil engineering, and user distribution. Therefore, operation and maintenance of modern networks face various challenges. When monitoring indices of a network have major exceptions, a problem may already occur in the network, and user experience is affected. Therefore, prediction of an exception of network performance and warning about a network failure are greatly significant for operation and maintenance of a network.

Operation and maintenance of current networks greatly depend on experience of experts. Because there are usually a relatively large quantity of network exceptions, in a manual manner, exceptions are usually categorized into different levels, and an exception with a high priority is processed preferentially. Even in such a manner, a large amount of labor work is required. Some automated tools are introduced in daily operation and maintenance work to help improve working efficiency of experts. These tools based on empirical rules cannot cover all problems. At network stations, a large amount of labor is required to individually optimize tools. Therefore, such a method that depends on experience of experts to process exceptions has a relatively high cost of operation and maintenance and has a relatively low accuracy rate of prediction.

SUMMARY

Embodiments of the present disclosure provide a network event prediction method and apparatus and a method and an apparatus for establishing a network-event prediction model in order to improve a prediction accuracy rate, and reduce a cost of network operation and maintenance.

A first aspect provides a network event prediction method, where the method includes determining signaling sequence data of a user according to signaling plane data of the user, where the signaling plane data of the user includes N pieces of signaling data and a timestamp of each of the N pieces of signaling data, each of the N pieces of signaling data includes a signaling type, and N is a positive integer greater than or equal to 1, determining a first probability value of occurrence of a first network event according to the signaling sequence data of the user and a first supervised prediction model, where the first supervised prediction model represents a mapping relationship between the signaling sequence data of the user and a probability value of occurrence of the first network event, determining a second probability value of occurrence of the first network event according to expert feature data of the user and a second supervised prediction model, where the expert feature data of the user represents a value of at least one preset feature of the user, and the second supervised prediction model represents a mapping relationship between the expert feature data of the user and a probability value of occurrence of the first network event, and determining a predicted occurrence probability of the first network event according to the first probability value and the second probability value.

For the network event prediction method provided in this embodiment of the present disclosure, signaling sequence data of a user is determined using signaling plane data of the user, a first probability value of occurrence of an event of the user is determined according to the signaling plane data of the user and a first supervised prediction model, a second probability value of occurrence of the event of the user is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event.

With reference to the first aspect, in a first possible implementation of the first aspect, determining signaling sequence data of a user according to signaling plane data of the user includes determining, according to the N pieces of signaling data of the user, N pieces of signaling that correspond one-to-one to the N pieces of signaling data, determining the signaling sequence data of the user according to M target signaling groups and the N pieces of signaling, where the signaling sequence data of the user represents whether the N pieces of signaling include $m_i$ pieces of target signaling that are arranged in a time order, an $i^{th}$ target signaling group of the M target signaling groups includes the $m_i$ pieces of target signaling that are arranged in a time order, i is less than or equal to M and is a positive integer greater than or equal to 1, and $m_i$ is a positive integer greater than or equal to 1.

With reference to the first aspect or the first possible implementation of the first aspect, in a second possible implementation of the first aspect, before determining a predicted occurrence probability of the first network event according to the first probability value and the second probability value, the method further includes determining, according to the signaling sequence data of the user and a first unsupervised prediction model, a first cluster to which the user belongs, where the first unsupervised prediction model represents a mapping relationship between the signaling sequence data of the user and a user cluster, and the first cluster belongs to the user cluster, and determining a predicted occurrence probability of the first network event according to the first probability value and the second probability value includes determining the predicted occurrence probability of the first network event according to the first probability value, the second probability value, and the first cluster.

With reference to the first aspect or the first possible implementation of the first aspect, in a third possible implementation of the first aspect, before determining a predicted occurrence probability of the first network event according to the first probability value and the second probability value, the method further includes determining, according to the expert feature data of the user and a second unsupervised prediction model, a second cluster to which the user belongs, where the second unsupervised prediction model represents a mapping relationship between the expert feature data of the user and a user cluster, and the second cluster belongs to the user cluster, and determining a predicted occurrence probability of the first network event according to the first probability value and the second probability value includes determining the predicted occurrence probability of the first network event according to the first probability value, the second probability value, and the second cluster.

With reference to the first aspect or any possible implementation of the first to third possible implementations of the first aspect, in a fourth possible implementation of the first aspect, the method further includes determining a prediction result of the first network event according to the predicted occurrence probability of the first network event, where the prediction result of the first network event represents whether the first network event is to occur, obtaining an actual result of occurrence of the first network event, where the actual result of occurrence of the first network event represents whether the first network event actually occurs, determining a prediction accuracy rate of the first network event according to the prediction result of the first network event and the actual result of occurrence of the first network event, and updating at least one of the first supervised prediction model or the second supervised prediction model when the prediction accuracy rate of the first network event is less than a threshold.

With reference to the first aspect or any possible implementation of the first to fourth possible implementations of the first aspect, in a fifth possible implementation of the first aspect, before determining a first probability value of occurrence of a first network event according to the signaling sequence data of the user and a first supervised prediction model, the method further includes determining signaling sequence data of each first sample user according to signaling plane data and first label information of each of multiple first sample users, where the signaling plane data of each first sample user includes N pieces of signaling data and a timestamp of each of the N pieces of signaling data, each of the N pieces of signaling data includes a signaling type, the first label information of each first sample user is used to represent whether the first network event of each first sample user actually occurs, and N is a positive integer greater than or equal to 1, and training the first supervised prediction model according to the signaling sequence data and the first label information of each first sample user, where the first supervised prediction model represents a mapping relationship between the signaling sequence data of each first sample user and the probability value of occurrence of the first network event.

With reference to the fifth possible implementation of the first aspect, in a sixth possible implementation of the first aspect, determining signaling sequence data of each first sample user according to signaling plane data and first label information of each of multiple first sample users includes determining, according to the signaling plane data of each of the multiple first sample users, the N pieces of signaling that correspond one-to-one to the N pieces of signaling data of each first sample user, determining M target signaling groups according to the N pieces of signaling of each first sample user and the first label information of each first sample user, where each target signaling group of the M target signaling groups includes m pieces of target signaling that are arranged in a time order, a mapping relationship exists between the m pieces of target signaling that are arranged in a time order and the first label information, and M and m are both positive integers greater than or equal to 1, and determining the signaling sequence data of each first sample user according to the M target signaling groups and the N pieces of signaling of each first sample user, where the signaling sequence data of each first sample user represents whether the N pieces of signaling of each first sample user include $m_i$ pieces of target signaling that are arranged in a time order, an $i^{th}$ target signaling group of the M target signaling groups includes the $m_i$ pieces of target signaling that are arranged in a time order, i is less than or equal to M and is a positive integer greater than or equal to 1, and $m_i$ is a positive integer greater than or equal to 1.

With reference to the first aspect or any possible implementation of the first to sixth possible implementations of the first aspect, in a seventh possible implementation of the first aspect, before a second probability value of occurrence of the event of the user is determined according to expert feature data of the user and a second supervised prediction model, the method further includes training the second supervised prediction model according to the expert feature data and second label information of each of multiple second sample users, where the expert feature data of each second sample user represents a value of at least one preset feature of each second sample user, the second supervised prediction model represents a mapping relationship between the expert feature data of each second sample user and the probability value of occurrence of the first network event, and the second label information of each second sample user is used to represent whether the first network event of each second sample user actually occurs.

With reference to any possible implementation of the second to seventh possible implementations of the first aspect, in an eighth possible implementation of the first aspect, before determining, according to the signaling sequence data of the user and a first unsupervised prediction model, a first cluster to which the user belongs, the method further includes training the first unsupervised prediction model according to the signaling sequence data of each of the multiple first sample users, where the first unsupervised prediction model represents a mapping relationship between the signaling sequence data of each first sample user and a user cluster.

With reference to any possible implementation of the third to seventh possible implementations of the first aspect, in a ninth possible implementation of the first aspect, before determining, according to the expert feature data of the user and a second unsupervised prediction model, a second cluster to which the user belongs, the method further includes training the second unsupervised prediction model according to the expert feature data of each of the multiple second sample users, where the second unsupervised prediction model represents a mapping relationship between the expert feature data of each second sample user and a user cluster.

For the network event prediction method provided in this embodiment of the present disclosure, signaling sequence data of a user is determined using signaling plane data of the user, a first probability value of occurrence of an event of the user is determined according to the signaling plane data of the user and a first supervised prediction model, a second probability value of occurrence of the event of the user is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event, and reducing a cost of network operation and maintenance.

A second aspect provides a method for establishing a network-event prediction model, where the method includes determining signaling sequence data of each first sample user according to signaling plane data and first label information of each of multiple first sample users, where the signaling plane data of each first sample user includes N pieces of signaling data and a timestamp of each of the N pieces of signaling data, each of the N pieces of signaling data includes a signaling type, the first label information of each first sample user is used to represent whether a first network event of each first sample user actually occurs, and N is a positive integer greater than or equal to 1, training a first supervised prediction model according to the signaling sequence data and the first label information of each first sample user, where the first supervised prediction model represents a mapping relationship between the signaling sequence data of each first sample user and a probability value of occurrence of the first network event, training a second supervised prediction model according to expert feature data and second label information of each of multiple second sample users, where the expert feature data of each second sample user represents a value of at least one preset feature of each second sample user, the second supervised prediction model represents a mapping relationship between the expert feature data of each second sample user and the probability value of occurrence of the first network event, and the second label information of each second sample user is used to represent whether the first network event of each second sample user actually occurs, and determining a first network-event prediction model according to the first supervised prediction model and the second supervised prediction model, where the first network-event prediction model is used to determine a predicted occurrence probability of the first network event.

For the method for establishing a network-event prediction model provided in this embodiment of the present disclosure, a first supervised prediction model is trained using signaling sequence data and first label information of each of multiple first sample users, a second supervised prediction model is trained using user plane data and second label information of each of multiple second sample users, and a first network-event prediction model is determined according to the first supervised prediction model and the second supervised prediction model. The first network-event prediction model can determine a prediction result of occurrence of an event, and the prediction result has a relatively high accuracy rate.

With reference to the second aspect, in a first possible implementation of the second aspect, determining signaling sequence data of each first sample user according to signaling plane data and first label information of each of multiple first sample users includes determining, according to the signaling plane data of each of the multiple first sample users, N pieces of signaling that correspond one-to-one to the N pieces of signaling data of each first sample user, determining M target signaling groups according to the N pieces of signaling of each first sample user and the first label information of each first sample user, where each target signaling group of the M target signaling groups includes m pieces of target signaling that are arranged in a time order, a mapping relationship exists between the m pieces of target signaling that are arranged in a time order and the first label information, and M and m are both positive integers greater than or equal to 1, and determining the signaling sequence data of each first sample user according to the M target signaling groups and the N pieces of signaling of each first sample user, where the signaling sequence data of each first sample user represents whether the N pieces of signaling of each first sample user include $m_i$ pieces of target signaling that are arranged in a time order, an $i^{th}$ target signaling group of the M target signaling groups includes the $m_i$ pieces of target signaling that are arranged in a time order, i is less than or equal to M and is a positive integer greater than or equal to 1, and $m_i$ is a positive integer greater than or equal to 1.

With reference to the second aspect or the first possible implementation of the second aspect, in a second possible implementation of the second aspect, before determining a first network-event prediction model according to the first supervised prediction model and the second supervised prediction model, the method further includes training the first unsupervised prediction model according to the signaling sequence data of each of the multiple first sample users, where the first unsupervised prediction model represents a mapping relationship between the signaling sequence data of each first sample user and a user cluster, and determining a first network-event prediction model according to the first supervised prediction model and the second supervised prediction model includes determining the first network-event prediction model according to the first supervised prediction model, the second supervised prediction model, and the first unsupervised prediction model.

With reference to the second aspect or the first possible implementation of the second aspect, in a third possible implementation of the second aspect, before determining a first network-event prediction model according to the first supervised prediction model and the second supervised prediction model, the method further includes training the second unsupervised prediction model according to the expert feature data of each of the multiple second sample users, where the second unsupervised prediction model represents a mapping relationship between the expert feature data of each second sample user and a user cluster, and determining a first network-event prediction model according to the first supervised prediction model and the second supervised prediction model includes determining the first network-event prediction model according to the first supervised prediction model, the second supervised prediction model, and the second unsupervised prediction model.

For the method for establishing a network-event prediction model provided in this embodiment of the present disclosure, a first supervised prediction model is trained using signaling sequence data and first label information of each of multiple first sample users, a second supervised prediction model is trained using user plane data and second label information of each of multiple second sample users, and a first network-event prediction model is determined according to the first supervised prediction model and the second supervised prediction model. The first network-event prediction model can determine a prediction result of occurrence of an event, and the prediction result has a relatively high accuracy rate. Moreover, a cost of network operation and maintenance can be reduced using the event prediction model.

A third aspect provides a network event prediction apparatus, where the apparatus includes a memory and a processor connected to the memory, where the memory is configured to store an instruction, the processor is configured to execute the instruction stored in the memory, and when executing the instruction stored in the memory, the processor is further configured to perform the method in the first aspect.

A fourth aspect provides an apparatus for establishing a network-event prediction model, where the apparatus includes a memory and a processor connected to the memory, where the memory is configured to store an instruction, the processor is configured to execute the instruction stored in the memory, and when executing the instruction stored in the memory, the processor is further configured to perform the method in the second aspect.

A fifth aspect provides a network event prediction apparatus, where the apparatus includes modules that perform the method in the first aspect.

A sixth aspect provides an apparatus for establishing a network-event prediction model, where the apparatus includes modules that perform the method in the second aspect.

BRIEF DESCRIPTION OF DRAWINGS

To describe the technical solutions in the embodiments of the present disclosure more clearly, the following briefly describes the accompanying drawings required for describing the embodiments of the present disclosure. The accompanying drawings in the following description show merely some embodiments of the present disclosure, and a person of ordinary skill in the art may still derive other drawings from these accompanying drawings without creative efforts.

FIG. 6 is a schematic flowchart of a method for establishing a network-event prediction model according to an embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
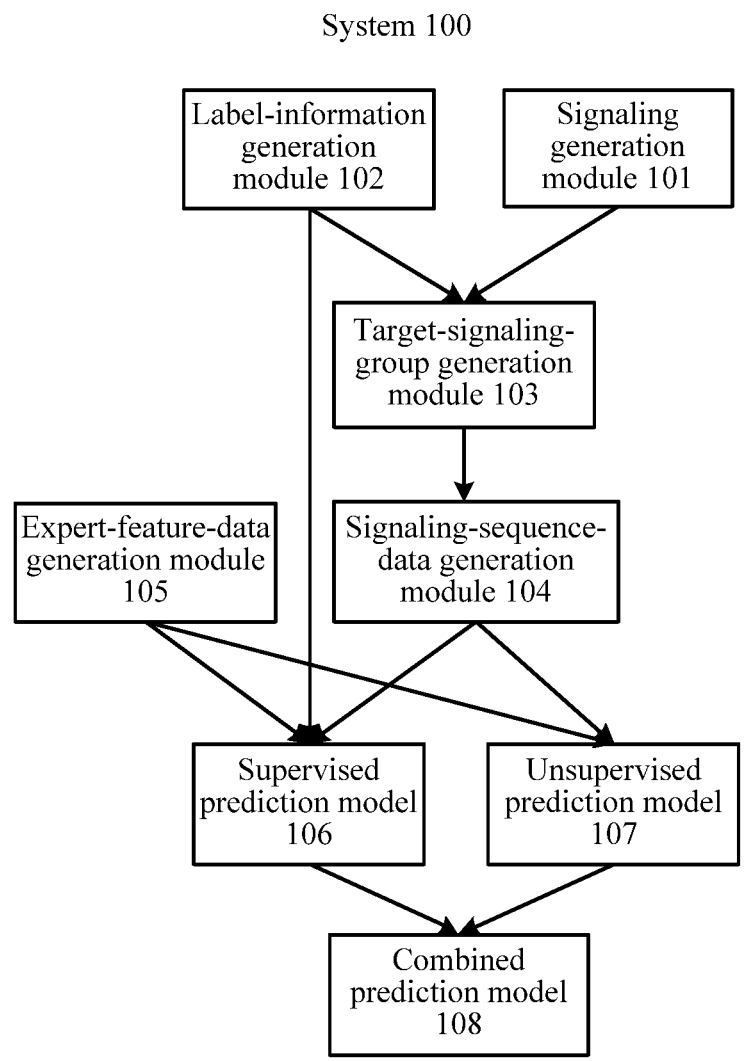
FIG. 1 is a schematic diagram of a system for establishing a network-event prediction model according to an embodiment of the present disclosure.

FIG. 1 is a schematic diagram of a system 100 for establishing a network-event prediction model according to an embodiment of the present disclosure. As shown in FIG. 1, the system 100 includes a signaling generation module 101, a label-information generation module 102, a target-signaling-group generation module 103, a signaling-sequence-data generation module 104, an expert-feature-data generation module 105, a supervised prediction model 106, an unsupervised prediction model 107, and a combined prediction model 108.

The signaling generation module 101 is configured to perform multiple times of sampling on signaling data of communication between each sample user of multiple first sample users and a network to obtain signaling plane data that can represent a network behavior of each first sample user within a period of time, where the signaling plane data of each first sample user includes N pieces of signaling data and a timestamp of each of the N pieces of signaling data, and generate, by performing encoding processing on the N pieces of signaling data of each first sample user, N pieces of signaling that correspond one-to-one to the N pieces of signaling data.

The label-information generation module 102 is configured to generate label information that represents a result about whether a first network event of each first sample user actually occurs. Because the label information usually arrives after a delay, the label information usually arrives in batches in a weekly form. Because a target-signaling-group construction module of signaling plane data needs to have label information, the system compresses and saves the signaling plane data and user plane data of each of the multiple first sample users within a week.

The target-signaling-group generation module 103 is configured to generate at least one target signaling group according to the signaling plane data and the first label information of each first sample user using an automatic sequence-feature construction algorithm after first label information of each first sample user arrives. The automatic sequence-feature construction algorithm here is an algorithm that can automatically retrieve a target signaling order group from a signaling sequence. The target signaling group appears at obviously different frequency/frequency in signaling plane data of a first sample user included in different types of first label information. That is, the target signaling in the target signaling group is closely related to occurrence of the first network event, and has an effect of determining an occurrence probability of an event or determining whether the event is to occur.

The signaling-sequence-data generation module 104 is configured to determine, according to M target signaling groups and N pieces of signaling of a to-be-tested user that are generated by the signaling generation module, signaling sequence data of the to-be-tested user, where the signaling sequence data of the to-be-tested user represents whether the N pieces of signaling of the to-be-tested user include $m_i$ pieces of preset signaling that are arranged in a time order, an $i^{th}$ target signaling group of the M target signaling groups includes the $m_i$ pieces of target signaling that are arranged in a time order, $1 \le i \le M$, and $m_i \ge 1$.

The expert-feature-data generation module 105 is configured to generate, using an expert feature project operator according to user plane data of each of multiple second sample users, expert feature data of each second sample user, where the expert feature data of each second sample user represents a value of at least one preset feature of each second sample user.

It should be understood that the preset feature herein refers to a series of features that are manually constructed based on the understanding of a service, and is used to depict a behavior of a user. Different preset features are set according to different service requirements. This is not limited in this embodiment of the present disclosure.

The supervised prediction model 106 is used to train a first supervised prediction model according to signaling sequence data and the first label information of each of the multiple first sample users using a supervised learning algorithm, where the first supervised prediction model represents a mapping relationship between the signaling sequence data of each first sample user and a probability value of occurrence of the first network event, or may train a second supervised prediction model according to the expert feature data and second label information of each of the multiple second sample users using a supervised learning algorithm, where the second supervised prediction model represents a mapping relationship between the expert feature data of each second sample user and a probability value of occurrence of the first network event.

Optionally, the first supervised prediction model and the second supervised prediction model may be trained based on one or more supervised learning algorithms. The supervised learning algorithm may be, for example, a decision tree algorithm, a logic regression algorithm, a support vector machine algorithm, and a combined algorithm. This is not limited in this embodiment of the present disclosure.

The unsupervised prediction model 107 is used to train a first unsupervised prediction model according to the signaling sequence data of each of the multiple first sample users using a clustering algorithm, where the first unsupervised prediction model represents a mapping relationship between the signaling sequence data of each first sample user and a user cluster, or train a second unsupervised prediction model according to the expert feature data of each of the multiple second sample users using a clustering algorithm, where the second unsupervised prediction model represents a mapping relationship between the expert feature data of each second sample user and a user cluster.

Optionally, the first unsupervised prediction model and the second unsupervised prediction model may be trained based on one or more clustering algorithms. The clustering algorithm may be, for example, a hierarchical clustering algorithm, a K-means algorithm, and an image-based clustering algorithm. This is not limited in this embodiment of the present disclosure.

The combined prediction model 108 is used to determine a predicted occurrence probability of the first network event according to output results of the first supervised prediction model, the second supervised prediction model, the first unsupervised prediction model, and the second unsupervised prediction model.

It should be understood that the combined prediction model may determine the probability value of occurrence of the first network event, and may determine, according to the probability value, whether the first network event is to occur, or may determine that a prediction result of the occurrence of the first network event is one of multiple possible results of occurrence of the first network event. However, this is not limited in this embodiment of the present disclosure.

Figure 2:
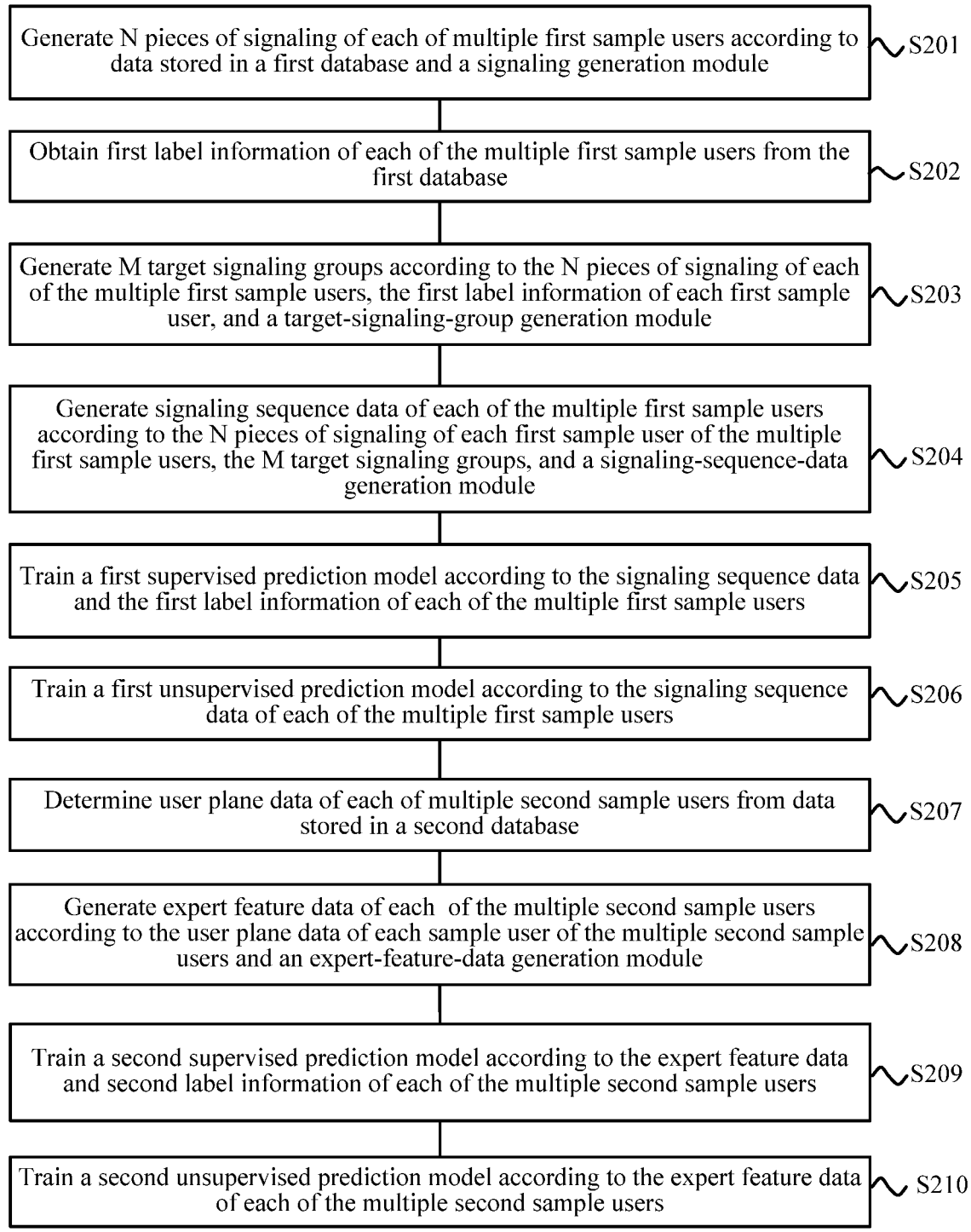
FIG. 2 is a schematic flowchart of a method for establishing a network-event prediction model according to an embodiment of the present disclosure.

FIG. 2 is a schematic flowchart of a method 200 for establishing a network-event prediction model according to an embodiment of the present disclosure. As shown in FIG. 2, the method 200 may be performed by the system for establishing a network-event prediction model in FIG. 1. The network-event prediction model includes a first supervised prediction model, a second supervised prediction model, a first unsupervised prediction model, a second unsupervised prediction model, and a combined prediction model. A prediction result of a network event may be determined according to the network-event prediction model.

A process of establishing the first supervised prediction model, the second supervised prediction model, the first unsupervised prediction model, and the second unsupervised prediction model in the network-event prediction model is described below in detail.

Step S201: Generate N pieces of signaling of each of multiple first sample users according to data stored in a first database and a signaling generation module.

It should be understood that the first database may include signaling data of communication between each of the multiple first sample users and a network.

Further, at each timestamp of at least one timestamp arranged in a time order, sampling is performed on the signaling data of communication between each of the multiple first sample users and the network to obtain signaling plane data of each first sample user, where the signaling plane data of each first sample user includes N pieces of signaling data and a timestamp of each of the N pieces of signaling data, and each piece of signaling data includes at least one piece of signaling-related data. After special encoding processing is performed on each piece of signaling data using a signaling sequence construction operator, signaling corresponding to each piece of signaling data is obtained.

Optionally, the timestamp may be a time that elapses after counting starts from a moment, and for example, may be a quantity of seconds after counting starts from 1970-01-01 00:00:00. However, this is not limited in this embodiment of the present disclosure.

The timestamp may be a start time of signaling transmission, an end time of signaling transmission or a time that is obtained by processing the start time and the end time. For example, the timestamp is an arithmetic mean of the start time and the end time, or the like. In Table 1, the timestamp is a start time of signaling transmission, and the signaling plane data exemplarily further includes an end time of signaling transmission. However, this is not limited in this embodiment of the present disclosure.

Optionally, the signaling data may include a signaling type. The signaling type may be represented using a numerical value. Each numerical value corresponds to a signaling type. However, the signaling type may also be represented using another form. In another optional embodiment, as shown in Table 1, the signaling data may further include an access network type and an attachment success mark. The access network type may be second generation (2G), third generation (3G) or fourth generation (4G), and may be represented using a numerical value. For example, 1 may be used to represent a 2G network, 2 may be used to represent a 3G network, and 3 may be used to represent a 4G network. However, this is not limited in this embodiment of the present disclosure. The attachment success mark may be used to represent that signaling is successfully received by a receive end. In Table 1, 0 is used to represent a reception failure, and 1 is used to represent a reception success. However, another manner may also be used for representation. This is not limited in this embodiment of the present disclosure.

It should be understood that this embodiment of the present disclosure is described using an example in which signaling data includes a signaling type, an access network type, and an attachment success mark. In this embodiment of the present disclosure, the signaling data may also include other data, which may be determined according to a network event that actually needs to be predicted. This is not limited in this embodiment of the present disclosure.

TABLE 1

| | Signaling type | Access network type | Attachment success mark | Start time | End time | ... |
|---|---|---|---|---|---|---|
| First sample user 1 | 1 | 2 | 1 | 1443431409 | 1443431414 | ... |
| First sample user 2 | 2 | 2 | 1 | 1443431435 | 1443431489 | ... |
| First sample user 3 | 3 | 3 | 1 | 1443431309 | 1443431315 | ... |
| | | | ... | | | |

In an optional embodiment, signaling-related data in each piece of signaling data may be bonded together, to obtain signaling corresponding to the signaling data. This is not limited in this embodiment of the present disclosure.

Optionally, a manner in Table 2 may be used to perform combined encoding on signaling data corresponding to each timestamp in Table 1 to generate a result in Table 3. For example, if a signaling type of signaling data of a first sample user is 1, an access network type is 2, and an attachment success mark is 1, the signaling data may be encoded as 121. That is, 121 is used to represent one piece of signaling. Optionally, the signaling data may further be encoded using another manner, to obtain one piece of signaling. This is not limited in this embodiment of the present disclosure.

TABLE 2

| Timestamp | 1443431409 | 1443431523 | 1443431608 | ... | 1443431716 |
|---|---|---|---|---|---|
| Signaling type | 2 | 1 | 2 | ... | 3 |
| Access network type | 2 | 2 | 3 | ... | 3 |
| Attachment success mark | 1 | 1 | 0 | ... | 1 |
| Signaling | 221 | 121 | 230 | ... | 331 |

Step S202: Obtain first label information of each of the multiple first sample users from the first database, where the first label information of each first sample user is used to represent a result about whether a first network event of each first sample user actually occurs.

In this way, results shown in Table 3 may be obtained. For example, when whether a user is to complain about an operator needs to be predicted, first label information of a first sample user may represent whether the first sample user is to make a complaint. In this case, the first label information may include 1 or 0, where 1 represents that a complaint is to be made, and 0 represents that no complaint is to be made. Alternatively, the first label information may include another representation parameter used to represent a result of occurrence of the first network event. This is not limited in this embodiment of the present disclosure.

TABLE 3

| | Signaling | Timestamp | First label information |
|---|---|---|---|
| First sample user 1 | 221, 121, 230, ..., 331 | 1443431409, 1443431523, 1443431608, ..., 1443431716 | 0 |
| First sample user 2 | 121, 121, ..., 321 | 1443431909, 1443432212, ..., 1443433398 | 0 |
| First sample user 3 | 321, 121, 130 | 1443431615, 1443432108, 1443432409 | 1 |
| | ... | | |

Step S203: Generate M target signaling groups according to the N pieces of signaling of each of the multiple first sample users, the first label information of each first sample user, and the target-signaling-group generation module, where each target signaling group of the M target signaling groups includes m pieces of target signaling that are arranged in a time order, a mapping relationship exists between the m pieces of target signaling that are arranged in a time order and the first label information, and M and m are both positive integers greater than or equal to 1.

It should be understood that the m pieces of target signaling that are arranged in a time order may be some signaling or all the signaling of the N pieces of signaling of each first sample user.

In an embodiment, it is assumed that a probability that signaling 121 and signaling 331 that are arranged in a time order appear in A first sample users who are labeled as 0 is 90%, and a probability that the signaling 121 and the signaling 331 that are arranged in a time order appear in B first sample users who are labeled as 1 is 5%. That is, the frequency/frequency of appearance in the A first sample users and the frequency/frequency of appearance in the B second sample users are obviously different, it may be regarded that the signaling 121 and the signaling 331 are target signaling. A group of the target signaling 121 and the target signaling 331 is closely related to occurrence of the first network event, and has an effect of predicting whether the first network event is to occur, where A and B are both integers greater than or equal to 1.

Optionally, the target signaling may further be feature signaling or a feature sequence. A target signaling group may further be a feature signaling group or a feature sequence group. This is not limited in this embodiment of the present disclosure.

In an embodiment, as shown in Table 4, target signaling 230, target signaling 131, and target signaling 331 are arranged in a timestamp order, and have an effect of determining an occurrence probability of an event or whether the event is to occur. 230, 131, and 331 may be referred to as a target signaling sequence group. This is not limited in this embodiment of the present disclosure.

TABLE 4

| Target signaling sequence group | Signaling |
|---|---|
| 1 | 230, 131, 331 |
| 2 | 121, 121 |
| 3 | 120, 130 |
| ... | |

Step S204: Generate signaling sequence data of each of the multiple first sample users according to the N pieces of signaling of each of the multiple first sample users, the M target signaling groups, and a signaling-sequence-data generation module.

Further, the signaling sequence data of each first sample user represents whether the N pieces of signaling of each first sample user include $m_i$ pieces of target signaling that are arranged in a time order, an $i^{th}$ target signaling group of the M target signaling groups includes the $m_i$ pieces of target signaling that are arranged in a time order, i is less than or equal to M and is a positive integer greater than or equal to 1, and $m_i$ is a positive integer greater than or equal to 1.

Optionally, as shown in Table 5, in the signaling sequence data of each first sample user, a numerical value 1 may be used to represent that all signaling of each first sample user includes target signaling of a target signaling group, that is, all the signaling of each first sample user includes all target signaling that is in the target signaling group and that is arranged in a time order. A numerical value 0 may be used to represent that all signaling of each first sample user does not include target signaling of the target signaling group, that is, all the signaling of each first sample user does not include each piece of target signaling in the target signaling group. Alternatively, although all the signaling of each first sample user includes each piece of target signaling in the target signaling group, each piece of target signaling in the target signaling group is not arranged in a time order. This is not limited in this embodiment of the present disclosure.

In an embodiment, Table 5 shows the signaling sequence data of each first sample user. All signaling of the first sample user 1 includes target signaling in a target signaling group 1 and a target signaling group 3, but does not include target signaling in a target signaling group 2. All signaling of the first sample user 2 includes target signaling in the target signaling group 2 and the target signaling group 3, but does not include target signaling in the target signaling group 1. All signaling of the first sample user 3 does not include target signaling in the target signaling group 1, the target signaling group 2 or the target signaling group 3. The target signaling group 1 includes the target signaling 230, 131, and 331, the target signaling group 2 includes the target signaling 121 and 121, and the target signaling group 3 includes target signaling 120 and 130. However, this is not limited in this embodiment of the present disclosure.

TABLE 5

| | Target signaling sequence group 1 | Target signaling sequence group 2 | Target signaling sequence group 3 | ... |
|---|---|---|---|---|
| First sample user 1 | 1 | 0 | 1 | ... |
| First sample user 2 | 0 | 1 | 1 | ... |
| First sample user 3 | 0 | 0 | 0 | ... |
| ... | | | | |

Step S205: Train a first supervised prediction model according to the signaling sequence data and the first label information of each of the multiple first sample users, where the first supervised prediction model represents a mapping relationship between the signaling sequence data of each first sample user and a probability value of occurrence of the first network event.

Further, the first supervised prediction model trains an optimal model using the signaling sequence data of each of the multiple first sample users and the first label information corresponding to the signaling sequence data of each first sample user and using a supervised learning algorithm. This model belongs to a set of functions, and optimally represents that under an evaluation rule, an output closest to an actual result may be obtained according to an input such that signaling sequence data input by a to-be-tested user may be mapped to a correspondingly output probability value of occurrence of the first network event using the first supervised prediction model. Simple determining is performed on the output in order to obtain a prediction result about whether the first network event is to occur.

As shown in Table 6, for example, when whether a user is to complain about an operator needs to be predicted, in the first label information, 1 represents that a complaint is to be made, and 0 represents that no complaint is to be made. The first supervised prediction model may obtain, according to signaling sequence data of the first sample user 1, that the first sample user 1 eventually makes a complaint, obtain, according to signaling sequence data of the first sample user 2, that the first sample user eventually makes a complaint, and obtain, according to signaling sequence data of the first sample user 3, that the first sample user eventually makes no complaint. The first supervised prediction model may be trained according to the relationship between the signaling sequence data of each sample user of the multiple first sample users and the first label information, to obtain a mapping relationship between an input and an output such that the first supervised prediction model may determine, according to the signaling sequence data of the to-be-tested user, a prediction result of a complaint event of the to-be-tested user.

Optionally, the first supervised prediction model may be based on one or more supervised learning algorithms. The supervised learning algorithm may be, for example, a decision tree algorithm, a logic regression algorithm, a support vector machine algorithm, and a combined algorithm. This is not limited in this embodiment of the present disclosure.

TABLE 6

| | Target signaling sequence group 1 | Target signaling sequence group 2 | Target signaling sequence group 3 | First label information |
|---|---|---|---|---|
| First sample user 1 | 1 | 0 | 1 | 1 |
| First sample user 2 | 0 | 1 | 1 | 1 |
| First sample user 3 | 0 | 0 | 0 | 0 |
| ... | ... | ... | ... | ... |

Step S206: Train the first unsupervised prediction model according to the signaling sequence data of each of the multiple first sample users, where the first unsupervised prediction model represents a mapping relationship between the signaling sequence data of each first sample user and a user cluster.

Further, the first unsupervised prediction model calculates a degree of similarity between the signaling sequence data of each of the multiple first sample users using a clustering algorithm, and groups the multiple first sample users into several subsets of first sample users. First sample users in each subset are similar, and first sample users in different subsets are not similar. Such a subset is referred to as a cluster. The first unsupervised prediction model may be used to determine a unique cluster to which each first sample user belongs.

Further, the first unsupervised prediction model calculates a degree of internal similarity between the signaling sequence data of each of the multiple first sample users using a clustering algorithm. For example, the first unsupervised prediction model may group, by calculating Euclidean distances between the multiple first sample users, the multiple first sample users into several subsets of first sample users. First sample users in each subset are similar, and first sample users in different subsets are not similar. Such a subset is referred to as a cluster. The first unsupervised prediction model may be used to determine, a unique cluster to which each first sample user belongs.

As shown in Table 5, for example, when whether a user is to complain about an operator needs to be predicted, the first unsupervised prediction model may train the first unsupervised prediction model by calculating Euclidean distances of the signaling sequence data between the first sample user 1, the first sample user 2, and the first sample user 3. In an optional embodiment, the first unsupervised prediction model may determine clusters of the multiple first sample users according to the signaling sequence data of each of the multiple first sample users such as the first sample user 1, the first sample user 2, and the first sample user 3 such that the first unsupervised prediction model may determine, according to the signaling sequence data of the to-be-tested user, a cluster to which the to-be-tested user belongs.

It should be understood that a quantity of user clusters of the first unsupervised prediction model is the same as a quantity of types of the first label information. Therefore, after the first unsupervised prediction model is trained, different inputs can be mapped to unsupervised prediction models of two types of output results. However, this is not limited in this embodiment of the present disclosure.

Optionally, the first unsupervised prediction model may train a model according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Step S207: Determine user plane data of each of multiple second sample users from data stored in a second database.

It should be understood that the second database includes communication data of communication between each of the multiple second sample users and the network. The communication data includes records of all operations of interaction between each second sample user and the network.

Optionally, the user plane data of each second sample user may include a Transmission Control Protocol (TCP) connection request quantity and a TCP connection success quantity of each second sample user. In an optional embodiment, as shown in Table 7, the user plane data of each second sample user may further include a get transaction request quantity and a get transaction success quantity of each second sample user. In this embodiment of the present disclosure, the user plane data of each second sample user may also include other data, which may be determined according to an event that actually needs to be predicted. This is not limited in this embodiment of the present disclosure.

TABLE 7

| | TCP connection request quantity | TCP connection success quantity | get transaction request quantity | get transaction success quantity | ... |
|---|---|---|---|---|---|
| Second sample user 1 | 100 | 34 | 10 | 4 | ... |
| Second sample user 2 | 94 | 45 | 14 | 6 | ... |
| Second sample user 3 | 46 | 23 | 26 | 23 | ... |
| | | ... | | | |

Step S208: Generate expert feature data of each of the multiple second sample users according to the user plane data of each sample user of the multiple second sample users and an expert-feature-data generation module.

It should be understood that the multiple first sample users and the multiple second sample users may be same sample users, or may be different sample users, or may be partially same sample users. The expert feature refers to a preset feature that is manually constructed based on understanding of different services and that is required by a specific service. This is not limited in the present disclosure.

Further, the expert feature data of each second sample user may be a value of a preset feature determined in the user plane data of each second sample user. For example, assuming that it is determined, according to a network event that actually needs to be predicted, that the preset feature is a TCP connection success rate, the expert feature data of each first sample user may be a numerical value of a TCP connection success rate of the first sample user, or a required expert feature may further be determined according to a network event that actually needs to be predicted. However, this is not limited in this embodiment of the present disclosure.

In an optional embodiment, as shown in Table 8, the expert feature data of each second sample user may be a TCP connection success rate and a get transaction request success rate. The TCP connection success rate and the get transaction request success rate may be represented using a decimal, or may be represented using a percentage. However, the TCP connection success rate and the get transaction request success rate may also be represented using another form. This is not limited in the present disclosure. The TCP connection success rate is a ratio of the TCP connection success quantity to the TCP connection request quantity. The get transaction request success rate is a ratio of the get transaction success quantity to the get transaction request quantity. For example, the TCP connection success rate of the second sample user 1 is 0.34, and the get transaction request success rate of the second sample user 1 is 0.4. This is not limited in this embodiment of the present disclosure.

Optionally, the expert feature data of each second sample user may further be determined according to a network event that actually needs to be predicted. This is not limited in this embodiment of the present disclosure.

TABLE 8

|  | TCP connection success rate | get transaction request success rate | ... |
|---|---|---|---|
| Second sample user 1 | 0.34 | 0.4 | ... |
| Second sample user 2 | 0.48 | 0.43 | ... |
| Second sample user 3 | 0.5 | 0.88 | ... |
|  | ... |  |  |

Step S209: Train a second supervised prediction model according to the expert feature data and second label information of each of the multiple second sample users, where the second supervised prediction model represents a mapping relationship between the expert feature data of each second sample user and a probability value of occurrence of a network event.

Further, the second supervised prediction model trains an optimal model using the expert feature data of each of the multiple second sample users and the second label information corresponding to the expert feature data of each second sample user and using a supervised learning algorithm. This model belongs to a set of functions, and optimally represents that under an evaluation rule, an output closest to an actual result may be obtained according to an input such that the expert feature data input by the to-be-tested user may be mapped using the second supervised prediction model to a correspondingly output probability value of occurrence of the first network event, and simple determining is performed on the output in order to obtain a prediction result about whether the first network event is to occur.

As shown in Table 9, for example, when whether a user is to complain about an operator needs to be predicted, in the first label information, "1" represents that a complaint is to be made, and "0" represents that no complaint is to be made. The second supervised prediction model may obtain, according to the expert feature data of the second sample user 1, that the user eventually makes a complaint, obtain, according to the expert feature data of the second sample user 2, that the user eventually makes a complaint, and obtain, according to the expert feature data of the second sample user 3, that the user eventually makes no complaint. The second supervised prediction model may be trained according to the relationship between the expert feature data and the second label information of each of the multiple second sample users, to obtain a mapping relationship between an input and an output, to enable the second supervised prediction model may determine, according to the expert feature data of the to-be-tested user, a prediction result of a complaint event of the to-be-tested user.

Optionally, the expert feature data of each of the multiple second sample users may be a numerical value of another expert feature determined according to an event that actually needs to be predicted. This is not limited in this embodiment of the present disclosure.

Optionally, the second supervised prediction model may be based on one or more supervised learning algorithms. The supervised learning algorithm may be, for example, a decision tree algorithm, a logic regression algorithm, a support vector machine algorithm, and a combined algorithm. This is not limited in this embodiment of the present disclosure.

TABLE 9

|  | TCP connection success rate | get transaction request success rate | Second label information |
|---|---|---|---|
| Sample user 1 | 0.34 | 0.4 | 1 |
| Sample user 2 | 0.48 | 0.43 | 1 |
| Sample user 3 | 0.5 | 0.88 | 0 |

Step S210: Train the second unsupervised prediction model according to the expert feature data of each of the multiple second sample users, where the second unsupervised prediction model represents a mapping relationship between the expert feature data of each second sample user and a cluster of a user.

Further, the second unsupervised prediction model calculates, using the clustering algorithm, a degree of internal similarity between the expert feature data of each of the multiple second sample users. For example, the second unsupervised prediction model may group, by calculating Euclidean distances of the expert feature data between the multiple second sample users, the multiple second sample users into several subsets of second sample users. Second sample users in each subset are similar, and second sample users in different subsets are not similar. Such a subset is referred to as a cluster. The second unsupervised prediction model may be used to determine a unique cluster to which each second sample user belongs.

As shown in Table 8, for example, when whether a user is to complain about an operator needs to be predicted, the first unsupervised prediction model may train the second unsupervised prediction model by calculating Euclidean distances of the expert feature data between the second sample user 1, the second sample user 2, and the second sample user 3. In an optional embodiment, the second unsupervised prediction model may train the second unsupervised prediction model using the clustering algorithm and according to the expert feature data of each of the multiple second sample users, where the expert feature data is, for example, that a TCP connection success rate of the second sample user 1 is 0.34, the get transaction request success rate of the second sample user 1 is 0.4, a TCP connection success rate of the second sample user 2 is 0.48, the get transaction request success rate of the second sample user 2 is 0.43, a TCP connection success rate of the second sample user 3 is 5, and the get transaction request success rate of the second sample user 3 is 0.88 such that the second unsupervised prediction model may determine, according to the expert feature data of the to-be-tested user, a cluster to which the to-be-tested user belongs.

It should be understood that as shown in Table 5, in this embodiment of the present disclosure, signaling sequence data of only three first sample users is used as an example to describe a modeling process of the first unsupervised prediction model. In a specific modeling process, the second unsupervised prediction model may further be trained according to signaling sequence data of the multiple first sample users. A target signaling group that exists when the second unsupervised prediction model is trained using the signaling sequence data of the multiple first sample users is equivalent to the preset feature that exists when the second unsupervised prediction model is trained using the expert feature data. A specific training process is similar to the training process of the expert feature data. However, this is not limited in this embodiment of the present disclosure.

Optionally, the second unsupervised prediction model may train the model according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

It should be understood that steps S201 to S206 are the method for establishing the first supervised prediction model and the first unsupervised prediction model according to the signaling sequence data of each of the multiple first sample users. Steps S207 to S210 are the method for establishing the second supervised prediction model and the second unsupervised prediction model according to the expert feature data of each of the multiple second sample users. The two methods are parallel methods. Therefore, an execution order of the two methods is interchangeable. This is not limited in the present disclosure.

In this embodiment of the present disclosure, the event prediction model may be determined according to the first supervised prediction model, the second supervised prediction model, and the combined prediction module. The combined prediction model represents a mapping between a probability value output by a supervised prediction model and a prediction result.

Optionally, in this embodiment of the present disclosure, the event prediction model may further be determined according to the first supervised prediction model, the second supervised prediction model, the first unsupervised prediction model, and the combined prediction model. The combined prediction model represents a prediction result and a mapping between a probability value output by the supervised prediction model and a cluster output by an unsupervised prediction model.

Optionally, in this embodiment of the present disclosure, the event prediction model may further be determined according to the first supervised prediction model, the second supervised prediction model, the second unsupervised prediction model, and the combined prediction model. The combined prediction model represents a prediction result and a mapping between a probability value output by the supervised prediction model and a cluster output by an unsupervised prediction model.

Optionally, in this embodiment of the present disclosure, the event prediction model may further be determined according to the first supervised prediction model, the second supervised prediction model, the first unsupervised prediction model, the second unsupervised prediction model, and the combined prediction model. The combined prediction model represents a prediction result and a mapping between a probability value output by the supervised prediction model and a cluster output by an unsupervised prediction model. However, this is not limited in this embodiment of the present disclosure.

Further, for multiple to-be-tested users, at least one first probability value and at least one second probability value of each to-be-tested user of the multiple to-be-tested users may be determined according to the first supervised prediction model and the second supervised prediction model and based on multiple supervised learning algorithms, and at least one first cluster and at least one second cluster of each to-be-tested user of the multiple to-be-tested users are determined according to the first unsupervised prediction model and the second unsupervised prediction model and based on multiple clustering algorithms in order to determine a function f. The function f is encoded and is used as an input of the combined prediction model. A function of the combined prediction model is optimized such that an error rate of the function of the combined prediction model is minimized in order to determine the probability value of occurrence of the first network event of each to-be-tested user of the multiple to-be-tested users. If a supervised prediction model or an unsupervised prediction model does not exist, a corresponding output of the model is not used in the function f. This is not limited in this embodiment of the present disclosure.

In this embodiment of the present disclosure, according to a network-event prediction model, the probability value of occurrence of the first network event may be determined, or it may be determined whether the first network event is to occur.

In another embodiment, in this embodiment of the present disclosure, it may further be determined, according to the network-event prediction model, that a prediction result of occurrence of the first network event is one of multiple possible results of occurrence of the first network event. However, this is not limited in this embodiment of the present disclosure.

For the method for establishing a network-event prediction model provided in this embodiment of the present disclosure, a first supervised prediction model is trained according to signaling sequence data and first label information of each of multiple first sample users, a second supervised prediction model is trained according to user plane data and second label information of each of multiple second sample users, and a first network-event prediction model is determined according to the first supervised prediction model and the second supervised prediction model. The first network-event prediction model can determine a prediction result of occurrence of a network event, and the prediction result has a relatively high accuracy rate. Moreover, a cost of network operation and maintenance can be reduced using the first network-event prediction model.

Figure 3:
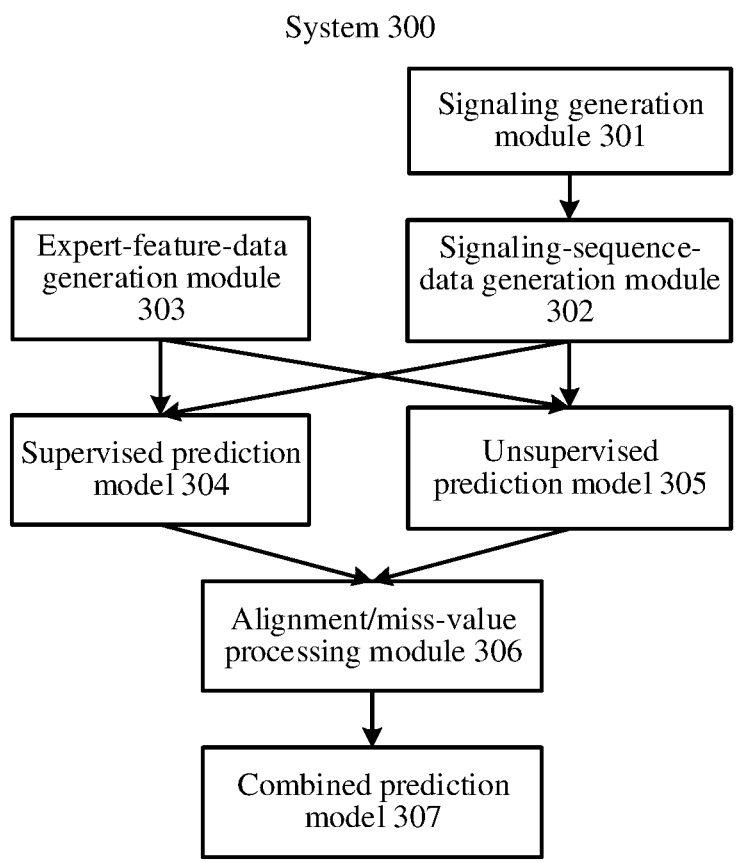
FIG. 3 is a schematic diagram of a network event prediction system according to an embodiment of the present disclosure.

FIG. 3 is a schematic diagram of a network event prediction system 300 according to an embodiment of the present disclosure. As shown in FIG. 3, the system 300 includes a signaling generation module 301, a signaling-sequence-data generation module 302, an expert-feature-data generation module 303, a supervised prediction model 304, an unsupervised prediction model 305, an alignment/miss-value processing module 306, and a combined prediction model 307.

The signaling generation module 301 is configured to perform multiple times of sampling on signaling data of communication between a to-be-tested user and a network to obtain signaling plane data that can represent a network behavior of the to-be-tested user within a period of time, where the signaling plane data of the to-be-tested user includes N pieces of signaling data and a timestamp of each of the N pieces of signaling data, and generate, by performing encoding processing on the N pieces of signaling data of the to-be-tested user, N pieces of signaling that correspond one-to-one to the N pieces of signaling data.

The signaling-sequence-data generation module 302 is configured to determine, according to M preset signaling groups and the N pieces of signaling of the to-be-tested user that are generated by the signaling generation module 301, signaling sequence data of the to-be-tested user, where the signaling sequence data of the to-be-tested user represents whether the N pieces of signaling of the to-be-tested user include $m_i$ pieces of preset signaling that are arranged in a time order, an $i^{th}$ preset signaling group of the M preset signaling groups includes the $m_i$ pieces of preset signaling that are arranged in a time order, $1 \leq i \leq M$, and $m_i \geq 1$.

The expert-feature-data generation module 303 is configured to generate expert feature data of the to-be-tested user according to user plane data of the to-be-tested user using an expert feature project operator, where the expert feature data of the to-be-tested user represents a value of at least one preset feature of the to-be-tested user.

It should be understood that the preset feature herein refers to a series of features that are manually constructed based on the understanding of a service, and is used to depict a behavior of a user. Different preset features are set according to different service requirements. This is not limited in this embodiment of the present disclosure.

The supervised prediction model 304 is used to predict a first probability value of occurrence of a first network event of the to-be-tested user according to the signaling sequence data of the to-be-tested user, or predict a second probability value of occurrence of the first network event of the to-be-tested user according to the expert feature data of the to-be-tested user.

Optionally, a first supervised prediction model and a second supervised prediction model may determine a probability of occurrence of the first network event of the to-be-tested user according to one or more supervised learning algorithms. The supervised learning algorithm may be, for example, a decision tree algorithm, a logic regression algorithm, a support vector machine algorithm, and a combined algorithm. This is not limited in this embodiment of the present disclosure.

The unsupervised prediction model 305 is used to predict, according to the signaling sequence data of the to-be-tested user, a first cluster to which the to-be-tested user belongs, or predict, according to an expert feature of the to-be-tested user, a second cluster to which the to-be-tested user belongs.

Optionally, the first unsupervised prediction model and the second unsupervised prediction model may determine, according to one or more clustering algorithms, a cluster to which the to-be-tested user belongs. The clustering algorithm may be, for example, a hierarchical clustering algorithm, a K-means algorithm, and an image-based clustering algorithm. This is not limited in this embodiment of the present disclosure.

The alignment/miss-value processing module 306 is configured to determine a miss, and perform imputation processing on a miss value. When the supervised prediction model and the unsupervised prediction model predict a result of an event, different pieces of data have different sources, and the time these pieces of data arrive at the system may be different. For signaling plane data and user plane data that belong to a same time point, when an interval between an output time of prediction using the signaling plane data and an output time of prediction using the user plane data exceeds a threshold, an output that is outside a time window is defined to be a miss. Because of problems such as a data heterogeneousness problem, a synchronousness problem of data/models, or a data privacy problem, a miss often occurs in outputs of the supervised prediction model and the unsupervised prediction model. In the present disclosure, a miss value is imputed using a miss value inference method.

The combined prediction model 307 is used to determine a prediction result of occurrence of the event of the to-be-tested user according to a probability value output by the supervised prediction model and a cluster output by the unsupervised prediction model.

Optionally, the combined prediction model may determine a predicted occurrence probability of the first network event according to at least one first probability value that is predicted by the first supervised prediction model and that is of occurrence of the first network event of the to-be-tested user and at least one second probability value that is predicted by the second supervised prediction model and that is of occurrence of the first network event of the to-be-tested user.

Optionally, the combined model may further determine a predicted occurrence probability of the first network event according to at least one first probability value that is predicted by the first supervised prediction model and that is of occurrence of the first network event of the to-be-tested user, at least one second probability value that is predicted by the second supervised prediction model and that is of occurrence of the first network event of the to-be-tested user, and at least one first cluster that is predicted by the first unsupervised prediction model and to which the to-be-tested user belongs.

Optionally, the combined model may further determine a predicted occurrence probability of the first network event according to at least one first probability value that is predicted by the first supervised prediction model and that is of occurrence of the first network event of the to-be-tested user, at least one second probability value that is predicted by the second supervised prediction model and that is of occurrence of the first network event of the to-be-tested user, and at least one second cluster that is predicted by the second unsupervised prediction model and to which the to-be-tested user belongs.

Optionally, the combined model may further determine a predicted occurrence probability of the first network event according to at least one first probability value that is predicted by the first supervised prediction model and that is of occurrence of the first network event of the to-be-tested user, at least one second probability value that is predicted by the second supervised prediction model and that is of occurrence of the first network event of the to-be-tested user, at least one first cluster that is predicted by the first unsupervised prediction model and to which the to-be-tested user belongs, and at least one second cluster that is predicted by the second unsupervised prediction model and to which the to-be-tested user belongs.

It should be understood that the combined prediction model may determine a probability value of occurrence of the first network event, and may determine, according to the probability value, whether the first network event is to occur, or may determine that the prediction result of the occurrence of the first network event is one of multiple possible results of occurrence of the first network event. However, this is not limited in this embodiment of the present disclosure.

Figure 4:
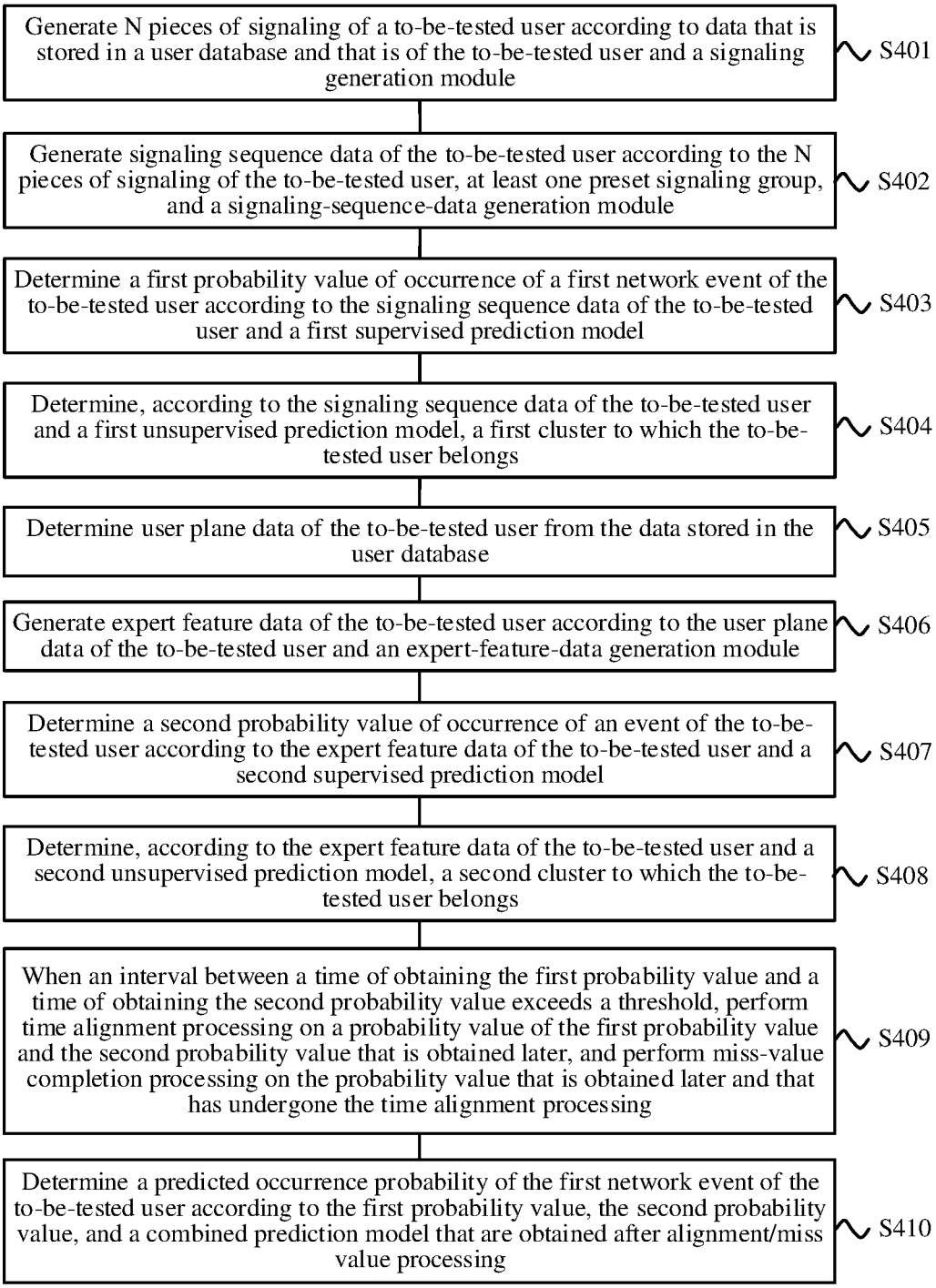
FIG. 4 is a schematic flowchart of a network event prediction method according to an embodiment of the present disclosure.

FIG. 4 is a schematic flowchart of a network event prediction method 400 according to an embodiment of the present disclosure. As shown in FIG. 4, the method 400 may be performed by the network event prediction system shown in FIG. 3.

Step S401: Generate N pieces of signaling of a to-be-tested user according to data that is stored in a user database and that is of the to-be-tested user and a signaling generation module, where the user database includes signaling data between the to-be-tested user and a network.

Further, at each timestamp of at least one timestamp arranged in a time order, sampling is performed on the signaling data of communication between the to-be-tested user and the network, to obtain signaling plane data of the to-be-tested user. The signaling plane data of the to-be-tested user includes N pieces of signaling data and a timestamp of each of the N pieces of signaling data. Each piece of signaling data includes at least one piece of signaling-related data. After special encoding processing is performed on each piece of signaling data using a signaling sequence construction operator, signaling corresponding to each piece of signaling data is obtained.

Optionally, the timestamp may be a time that elapses after counting starts from a moment, for example, may be a quantity of seconds after counting starts from 1970-01-01 00:00:00. However, this is not limited in this embodiment of the present disclosure.

The timestamp may be a start time of signaling transmission, an end time of signaling transmission or a time that is obtained by processing the start time and the end time. For example, the timestamp is an arithmetic mean of the start time and the end time, or the like. In Table 10, the timestamp is a start time of signaling transmission, and the signaling plane data exemplarily further includes an end time of signaling transmission. However, this is not limited in this embodiment of the present disclosure.

TABLE 10

| Signaling data | Signaling type | Access network type | Attachment success mark | Start time | End time | ... |
|---|---|---|---|---|---|---|
| To-be-tested user | 1 | 2 | 1 | 1443431409 | 1443431414 | ... |

In an optional embodiment, signaling-related data in each piece of signaling data may be bonded together, to obtain signaling corresponding to the signaling data. This is not limited in this embodiment of the present disclosure.

Further, combined encoding may be performed using a manner in Table 11 on signaling data corresponding to timestamps in Table 10 in order to generate results in Table 12. For example, if a signaling type of a to-be-tested user is 1, an access network type of the to-be-tested user is 2, and an attachment success mark of the to-be-tested user is 1, the signaling data may be encoded as 121. That is, 121 is used to represent one piece of signaling. Optionally, the signaling data may further be encoded using another manner, to obtain one piece of signaling, This is not limited in this embodiment of the present disclosure.

TABLE 11

| Timestamp | 1443431409 | 1443431523 | 1443431608 | ... | 1443431716 |
|---|---|---|---|---|---|
| Signaling type | 2 | 1 | 2 | ... | 3 |
| Access network type | 2 | 2 | 3 | ... | 3 |
| Attachment success mark | 1 | 1 | 0 | ... | 1 |
| Signaling | 221 | 121 | 230 | ... | 331 |

Optionally, the signaling data may include a signaling type. The signaling type may be represented using a numerical value. Each numerical value corresponds to a signaling type. However, the signaling type may also be represented using another form. In another optional embodiment, as shown in Table 1, the signaling data may further include an access network type and an attachment success mark. The access network type may be 2G, 3G or 4G, and may be represented using a numerical value. For example, 1 may be used to represent a 2G network, 2 may be used to represent a 3G network, and 3 may be used to represent a 4G network. However, this is not limited in this embodiment of the present disclosure. The attachment success mark may be used to represent that signaling is successfully received by the receive end. In Table 1, 0 is used to represent a reception failure, and 1 is used to represent a reception success. However, another manner may also be used for representation. This is not limited in this embodiment of the present disclosure.

It should be understood that this embodiment of the present disclosure is described using an example in which signaling data includes a signaling type, an access network type, and an attachment success mark. In this embodiment of the present disclosure, the signaling data may also include other data, which may be further determined according to a network event that actually needs to be predicted. This is not limited in this embodiment of the present disclosure.

TABLE 12

| | Signaling | Timestamp |
|---|---|---|
| To-be-tested user | 221, 121, 230, ..., 331 | 1443431409, 1443431523, 1443431608, ..., 1443431716 |

Step S402: Generate signaling sequence data of the to-be-tested user according to the N pieces of signaling of the to-be-tested user, at least one preset signaling group, and a signaling-sequence-data generation module.

Further, the signaling sequence data of the to-be-tested user represents whether the N pieces of signaling of the to-be-tested user include $m_i$ pieces of preset signaling that are arranged in a time order, an $i^{th}$ preset signaling group of M preset signaling groups includes the $m_i$ pieces of preset signaling that are arranged in a time order, i is less than or equal to M and is a positive integer greater than or equal to 1, and $m_i$ is a positive integer greater than or equal to 1.

In an embodiment, assuming that all signaling corresponding to the to-be-tested user is $S_1, S_2, \ldots$, and $S_N$, timestamps corresponding to the signaling of all the signaling of the to-be-tested user are $T_1, T_2, \ldots$, and $T_N$. The signaling-sequence-data generation module includes target signaling $S_{i_1}, S_{i_2}, \ldots$, and $S_{i_M}$ that is arranged in a time order, where $1 \leq i_1 < i_2 < \ldots < i_M \leq N$, and $p \geq 1$. Assuming that a quantity of target signaling sequence groups is p, the signaling sequence data of the to-be-tested user may be represented using a vector $(X_1^{(S)}, X_2^{(S)}, \ldots, X_p^{(S)})$.

Optionally, as shown in Table 13, in the signaling sequence data of the to-be-tested user, a numerical value 1 may be used to represent that all the signaling of the to-be-tested user includes preset signaling in a preset signaling group, that is, all the signaling of each first sample user includes all preset signaling that is arranged in a time order in the preset signaling group. A numerical value 0 may be used to represent that all signaling of the to-be-tested user does not include preset signaling in a preset signaling group, that is, all the signaling of the to-be-tested user does not include each piece of preset signaling in the preset signaling group. Alternatively, although all the signaling of the to-be-tested user includes each piece of preset signaling in the preset signaling group, each piece of preset signaling in the preset signaling group is not arranged in a time order. This is not limited in this embodiment of the present disclosure.

Table 13 shows the signaling sequence data of the to-be-tested user. All the signaling of the to-be-tested user includes preset signaling in a preset signaling group 1 and a preset signaling group 3, but does not include preset signaling in a preset signaling group 2. However, this is not limited in this embodiment of the present disclosure.

TABLE 13

| | Preset signaling group 1 | Preset signaling group 2 | Preset signaling group 3 | ... |
|---|---|---|---|---|
| To-be-tested user | 1 | 0 | 1 | ... |

Step S403: Determine a first probability value of occurrence of a first network event of the to-be-tested user according to the signaling sequence data of the to-be-tested user and a first supervised prediction model, where the first supervised prediction model represents a mapping relationship between the signaling sequence data of the to-be-tested user and a probability value of occurrence of the first network event.

Optionally, before step S403, the first supervised prediction model may be trained according to signaling sequence data and first label information of each of multiple first sample users.

Optionally, the first supervised prediction model may determine the probability value of occurrence of the first network event of the to-be-tested user according to one or more supervised learning algorithms. The supervised learning algorithm may be, for example, a decision tree algorithm, a logic regression algorithm, a support vector machine algorithm, and a combined algorithm. This is not limited in this embodiment of the present disclosure.

Step S404: Determine, according to the signaling sequence data of the to-be-tested user and a first unsupervised prediction model, a first cluster to which the to-be-tested user belongs, where the first unsupervised prediction model represents a mapping relationship between the signaling sequence data of the to-be-tested user and a user cluster.

Optionally, before step S404, the first unsupervised prediction model may be trained according to the signaling sequence data of each of the multiple first sample users.

Optionally, the first unsupervised prediction model may determine a cluster of occurrence of the event of the to-be-tested user according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Step S405: Determine user plane data of the to-be-tested user from the data stored in the user database, where the user database includes communication data of communication between the to-be-tested user and the network, and the communication data includes records of all operations of interaction between the to-be-tested user and the network.

Optionally, the user plane data of the to-be-tested user may include a TCP connection request quantity and a TCP connection success quantity of the to-be-tested user. In an optional embodiment, as shown in Table 14, the user plane data of the to-be-tested user may further include a get transaction request quantity and a get transaction success quantity of the to-be-tested user. In this embodiment of the present disclosure, the user plane data of the to-be-tested user may also include other data, which may be determined according to an event that actually needs to be predicted. This is not limited in this embodiment of the present disclosure.

TABLE 14

| | TCP connection request quantity | TCP connection success quantity | get transaction request quantity | get transaction success quantity | ... |
|---|---|---|---|---|---|
| To-be-tested user | 100 | 34 | 10 | 4 | ... |

Step S406: Generate expert feature data of the to-be-tested user according to the user plane data of the to-be-tested user and an expert-feature-data generation module.

It should be understood that the multiple first sample users and multiple second sample users may be same sample users, or may be different sample users, or may be partially same sample users. The expert feature refers to a preset feature that is manually constructed based on understanding of different services and that is required by a specific service. This is not limited in the present disclosure.

Further, the expert feature data of the to-be-tested user may be a value of a preset feature determined in the user plane data of the to-be-tested user. For example, assuming that it is determined, according to an event that actually needs to be predicted, that the preset feature is a TCP connection success rate, the expert feature data of the to-be-tested user may be a numerical value of a TCP connection success rate of the to-be-tested user, or an expert feature that is required may further be determined according to an event that actually needs to be predicted. However, this is not limited in this embodiment of the present disclosure.

In an optional embodiment, as shown in Table 15, the expert feature data of the to-be-tested user may be a TCP connection success rate and a get transaction request success rate. The TCP connection success rate and the get transaction request success rate may be represented using a decimal, or may be represented using a percentage. However, another form may also be used for representation. This is not limited in the present disclosure. The TCP connection success rate is a ratio of the TCP connection success quantity to the TCP connection request quantity. The get transaction request success rate is a ratio of the get transaction success quantity to the get transaction request quantity. For example, a TCP connection success rate of a to-be-tested user is 0.34, and a get transaction request success rate of the to-be-tested user is 0.4. This is not limited in this embodiment of the present disclosure.

Optionally, the expert feature data of the to-be-tested user may further be further determined according to a network event that actually needs to be predicted. This is not limited in this embodiment of the present disclosure.

In an embodiment, assuming that a quantity of expert features is q, the expert feature data of the user may be represented using a vector $(X_1^{(E)}, X_2^{(E)}, \ldots, X_p^{(E)})$, where $q \geq 1$.

TABLE 15

|  | TCP connection success rate | get transaction request success rate | ... |
|---|---|---|---|
| To-be-tested user | 0.34 | 0.4 | ... |

Step S407: Determine a second probability value of occurrence of an event of the to-be-tested user according to the expert feature data of the to-be-tested user and a second supervised prediction model, where the second supervised prediction model represents a mapping relationship between the expert feature data of the to-be-tested user and a probability value of occurrence of a network event.

Optionally, before step S407, the second supervised prediction model may be trained according to the expert feature data and second label information of each of the multiple second sample users.

Optionally, the second supervised prediction model may determine a probability value of occurrence of the event of the to-be-tested user according to one or more supervised learning algorithms. The supervised learning algorithm may be, for example, a decision tree algorithm, a logic regression algorithm, a support vector machine algorithm, and a combined algorithm. This is not limited in this embodiment of the present disclosure.

Step S408: Determine, according to the expert feature data of the to-be-tested user and the second unsupervised prediction model, a second cluster to which the to-be-tested user belongs, where the second unsupervised prediction model represents a mapping relationship between the expert feature data of the to-be-tested user and a user cluster.

Optionally, before step S408, the second unsupervised prediction model may be trained according to the expert feature data of each of the multiple second sample users.

Optionally, the second unsupervised prediction model may determine a cluster of occurrence of the event of the to-be-tested user according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Figure 5:
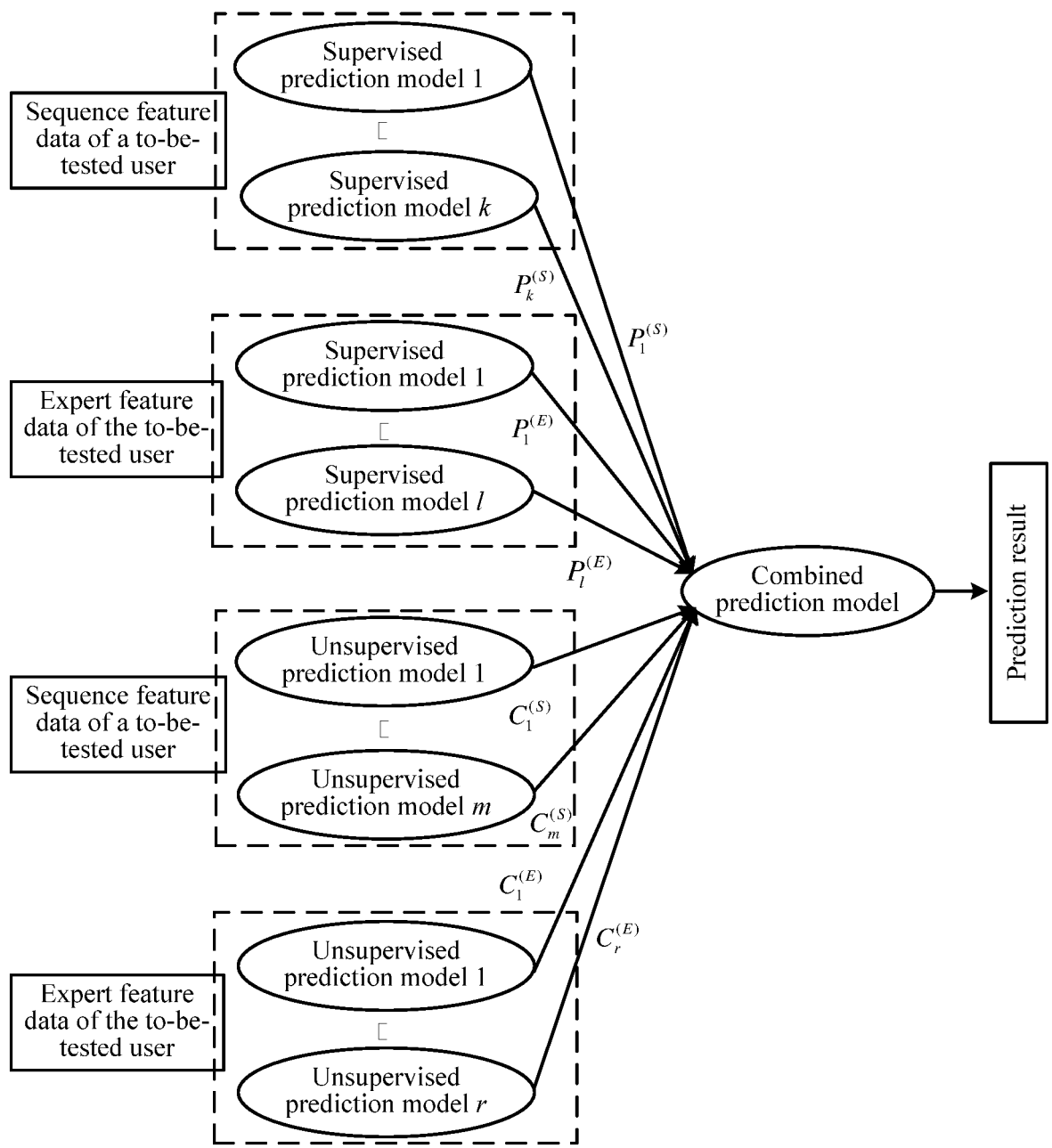
FIG. 5 is a schematic diagram of a network event prediction method according to an embodiment of the present disclosure.

As shown in FIG. 5, in an embodiment, for the to-be-tested user, assuming that the first supervised prediction model has k supervised prediction algorithms, a probability output of the first supervised prediction model is $(P_1^{(S)}, P_2^{(S)}, \ldots, P_k^{(S)})$. Assuming that the second supervised prediction model has l supervised prediction algorithms, an output of the second supervised prediction model is $(P_1^{(E)}, P_2^{(E)}, \ldots, P_l^{(E)})$, where k, $l \geq 1$, and k and l may have equal values or may have unequal values.

Assuming that the first unsupervised prediction model has m clustering algorithms, an output of the first unsupervised prediction model is $(C_1^{(S)}, C_2^{(S)}, \ldots, C_m^{(S)})$. Assuming that the second unsupervised prediction model has r clustering algorithms, an output of the second unsupervised prediction model is $(C_1^{(E)}, C_2^{(E)}, \ldots, C_r^{(E)})$, where m, $r \geq 1$, and m and r may have equal values or may have unequal values.

It should be understood that steps S401 to S404 are the method for predicting, according to the signaling sequence data of the to-be-tested user, a probability value of occurrence of the first network event and the first cluster to which the to-be-tested user belongs. Steps S405 to S408 are the method for predicting, according to the expert feature data of the to-be-tested user, a probability value of occurrence of the first network event and the second cluster to which the to-be-tested user belongs. The two methods are parallel methods. Therefore, an execution order of the two methods is interchangeable. This is not limited in the present disclosure.

Step S409: When an interval between a time of obtaining the first probability value and a time of obtaining the second probability value exceeds a threshold, perform time alignment processing on a probability value of the first probability value and the second probability value that is obtained later, and perform miss-value imputation processing on the probability value that is obtained later and that has undergone the time alignment processing.

Further, it is assumed that first probability values that are determined by the first supervised prediction model and that are of a reference user 1, a reference user 2, a reference user 3, and the to-be-tested user are respectively M1, M2 and, M4, where M1, M2 and M4 may be first probability values that are determined by the first supervised prediction model using different supervised learning algorithms. Second probability values that are determined by the second supervised prediction model and that are of the reference user 1, the reference user 2, the reference user 3, and the to-be-tested user are M3. As shown in Table 16, because an interval between a time of obtaining the first probability value of the to-be-tested user by the first supervised prediction model and a time of obtaining the second probability value of the to-be-tested user exceeds a threshold, and the time of obtaining the first probability value of the to-be-tested user is earlier than the time of obtaining the second probability value of the to-be-tested user, in this case, time alignment processing may be performed on the second probability value M3 of the to-be-tested user, and miss-value imputation is performed on M3 according to a first probability value and a second probability value of another user.

It should be understood that because of problems such as a data heterogeneousness problem, a synchronousness problem of data/models, or a data privacy problem, a miss also occurs in a first probability value and a second probability value output by a supervised prediction model. This is not limited in this embodiment of the present disclosure.

It should be further understood that the reference user 1, the reference user 2, and the reference user 3 herein may be to-be-tested users other than the to-be-tested user, and the reference user 1, the reference user 2, and the reference user 3 do not have a miss of a probability value. This is not limited in this embodiment of the present disclosure.

In an optional embodiment, as shown in Table 16, for a value of M3 of the to-be-tested user, Euclidean distances between the vector 1, the vector 2, the vector 3, and the vector x may be determined according to a vector 1 that is generated from values of M1, M2, and M4 of the reference user 1, a vector 2 that is generated from values of M1, M2, and M4 of the reference user 2, a vector 3 that is generated from values of M1, M2, and M4 of the reference user 3, and a vector x that is generated from values of M1, M2, and M4 of the to-be-tested user. According to values of the Euclidean distances between the vectors, it is determined that the to-be-tested user is close to one reference user of the reference user 1, the reference user 2, or the reference user 3. Assuming that the reference user 1 is close to the to-be-tested user, the value of M3 of the reference user 1 is determined to be the value of M3 that is missing of the to-be-tested user. However, this is not limited in this embodiment of the present disclosure.

Optionally, a miss of a user cluster may similarly occur in an output of an unsupervised prediction model. An alignment/miss-value processing module may similarly encode a reference type that is output by the unsupervised prediction model and that is of each reference user. Inference is performed for a missing cluster. This is not limited in this embodiment of the present disclosure.

TABLE 16

|  | M1 | M2 | M3 | M4 |
|---|---|---|---|---|
| Reference user 1 | 0.3 | 0.5 | 0.4 | 0.1 |
| Reference user 2 | 0.7 | 0.5 | 0.8 | 0.6 |
| Reference user 3 | 0.7 | 0.8 | 0.8 | 0.7 |
| To-be-tested user | 0.1 | 0.2 | ? | 0.2 |

Step S410: Determine a predicted occurrence probability of the first network event of the to-be-tested user according to the first probability value, the second probability value, and a combined prediction model that are obtained after alignment/miss value processing.

Optionally, in an optional embodiment, the combined prediction model may determine the predicted occurrence probability of the first network event of the to-be-tested user according to only weighting, averaging or another calculation rule of the first probability value and the second probability value.

Optionally, in another optional embodiment, the combined prediction model may further determine the predicted occurrence probability of the first network event of the to-be-tested user jointly according to weighting, averaging or another calculation rule of the first probability value and the second probability value and the first cluster to which the to-be-tested user belongs.

Optionally, in another optional embodiment, the combined prediction model may further determine the predicted occurrence probability of the first network event of the to-be-tested user according to weighting, averaging or another calculation rule of the first probability value and the second probability value and with reference to the second cluster to which the to-be-tested user belongs.

Optionally, in another optional embodiment, the combined prediction model may further determine the predicted occurrence probability of the first network event of the to-be-tested user according to weighting, averaging or another calculation rule of the first probability value and the second probability value and with reference to the first cluster and the second cluster to which the to-be-tested user belongs. This is not limited in this embodiment of the present disclosure.

Further, for multiple to-be-tested users, at least one first probability value and at least one second probability value of each to-be-tested user of the multiple to-be-tested users may be determined according to the first supervised prediction model and the second supervised prediction model and based on multiple supervised learning algorithms, and at least one first cluster and at least one second cluster of each to-be-tested user of the multiple to-be-tested users are determined according to the first unsupervised prediction model and the second unsupervised prediction model and based on multiple clustering algorithms in order to determine a function f. The function f is encoded and is used as an input of the combined prediction model. A function of the combined prediction model is optimized such that an error rate of the function of the combined prediction model is minimized in order to determine a probability value of occurrence of the first network event of each to-be-tested user of the multiple to-be-tested users. If a supervised prediction model or an unsupervised prediction model does not exist, a corresponding output of the model is not used in the function f. This is not limited in this embodiment of the present disclosure.

In an embodiment, in this embodiment of the present disclosure, according to a network-event prediction model, the probability value of occurrence of the first network event may be determined, or it may be determined whether the first network event is to occur.

In another embodiment, in this embodiment of the present disclosure, it may further be determined, according to the network-event prediction model, that a prediction result of occurrence of the first network event is one of multiple possible results of occurrence of the first network event. However, this is not limited in this embodiment of the present disclosure.

In an optional embodiment, as shown in FIG. 5, in an embodiment of predicting a probability that a user is to make a complaint, it is assumed that output results of the first supervised prediction model, the second supervised prediction model, the first unsupervised prediction model, and the second unsupervised prediction model of the user are: $f=(P_1^{(S)}, P_2^{(S)}, \ldots, P_k^{(S)}, P_1^{(E)}, P_2^{(E)}, \ldots, P_l^{(E)}, C_1^{(S)}, C_2^{(S)}, \ldots, C_m^{(S)}, C_1^{(E)}, C_2^{(E)}, \ldots, C_r^{(E)})$, where f is encoded as follows. Each value of an f vector is encoded using two values. For an output result of the supervised prediction model, (p, 1-p) is used to encode an original p. For an output result of the unsupervised prediction model, (1, 0) and (0, 1) are used to encode a type of a cluster. The encoded f vector is marked as $f=(a_1, a_2, \ldots, a_v)$, where $v=2*(k+l+m+r)$, and k, l, m, and r are all integers greater than or equal to 1.

When a quantity of users to be predicted is n, where n>1, a matrix A is marked as an f vector of all users, where each row represents one user, and is represented using the following formula:

$$A = \begin{pmatrix} f_1 \\ f_2 \\ \vdots \\ f_n \end{pmatrix} = \begin{bmatrix} a_{11} & \cdots & a_{1v} \\ \vdots & \ddots & \vdots \\ a_{n1} & \cdots & a_{nv} \end{bmatrix} \quad (1)$$

A matrix Y is marked as a corresponding relationship between a type of an output of a model and an actual type, and is represented using the following formula:

$$Y = \begin{bmatrix} 1 & 0 \\ 0 & 1 \\ 1 & 0 \\ 0 & 0 \end{bmatrix} \quad (2)$$

where (1, 0) and (0, 1) represent that the model is a supervised prediction model. (0, 0) represents that the model is an unsupervised prediction model. In this embodiment, (1, 0) is that a prediction type of the supervised prediction model is a complaining type, and (0, 1) represents that a prediction type of the supervised prediction model is a non-complaining type.

It should be understood that a quantity of columns in the Y matrix is a quantity of prediction types. In this embodiment, the quantity of prediction types is two types (that is, a complaining type and a non-complaining type). A quantity of rows of Y is a value of v, and represents an output result of each model.

It should be understood that an actual quantity of results output by models is k+l+m+r. However, a series of encoding is performed on an f vector. A total output result after encoding is v=2*(k+l+m+r).

A matrix Q is marked to represent a probability relationship between a theoretical type of output by a model and a corresponding actual type. Values of all elements in the matrix are unknown:

$$Q=[q_{ij}].$$

A matrix U is marked as a matrix of a probability that each user belongs to each type, where each user occupies a row. Values of all elements in the matrix are unknown, and are final prediction results of the present disclosure:

$$U=[u_{ij}].$$

where $u_{ij}$ represents a prediction result of a $j^{th}$ type of an $i^{th}$ user. In this embodiment, j includes a complaining type and a non-complaining type. The matrix U represents a prediction result of a complaining type of a user or a result of a non-complaining type. A sum of results of the complaining type and the non-complaining type is 1.

When the following formula is optimized to obtain a minimum value of the formula, a value of the matrix U is determined, that is, the value of the matrix U is a final prediction result of n users. A prediction result is compared with a prediction threshold to determine a complaining user and a non-complaining user of the n users, $$\min_{Q,U} \sum_{i=1}^{n} \sum_{j=1}^{v} a_{ij} \| u_i - q_j \|^2 + \alpha \sum_{j=1}^{v} k_j \| q_j - y_j \|^2 \qquad (3)$$

where α is an adjustable parameter, $k_j = \mathring{a}_1^c y_{jz}$.

Optionally, when a prediction result of the $n^{th}$ user is predicted, the following may be defined according to an $n^{th}$ to-be-tested user:

$$D_v = \mathrm{diag}\{(\mathring{a}_{i=1}^n a_{ij})\}_{v,v},$$

that is, a diagonal matrix whose diagonal element is:

$$\mathring{a}_{i=1}^n a_{ij},$$

$$D_n = \mathrm{diag}\{(\mathring{a}_{j=1}^v a_{ij})\}_{n,n},$$

that is, a diagonal matrix whose diagonal element is:

$$\mathring{a}_{j=1}^v a_{ij},$$

$$K_v = \mathrm{diag}\{k_j\}_{v,v},$$

that is, a diagonal matrix whose diagonal element is: $k_j$, where $k_j = \mathring{a}_{z=1}^c y_{jz}$. $y_{jz}$ here is an element in the matrix Y, where c represents a quantity of columns of Y, and c represents a quantity of prediction types. In this embodiment, c is 2.

$$D_l = (D_v + aK_v)^{-1} D_v;$$

$$D_{1-l} = (D_v + aK_v)^{-1}(aK_v);$$

$$S = D_v^{-1} A' D_n^{-1} A;$$

$$Q = (I - D_k S)^{-1} D_{1-l} Y.$$

In this case, for an $(n+1)^{th}$ to-be-tested user, a prediction result may be determined using the following formula:

$$u_{n+1,\cdot} = \frac{1}{h} \mathring{a}_{j=1}^v a_{n+1,j} Q_j. \qquad (4)$$

where h represents a quantity of models, that is, k+l+m+r, $u_{n+1,\cdot}$ is a vector whose length is c, and represents a probability of a prediction type.

Optionally, after a prediction result of occurrence of an event of each user of multiple users is determined using an event prediction model, an actual result of occurrence of the event of each of the multiple users may be obtained. A prediction accuracy rate is determined according to the prediction result of occurrence of the event of each user and the actual result of occurrence of the event of each user. When the prediction accuracy rate is less than a threshold, at least one of the first supervised prediction model or the second supervised prediction model is updated.

Optionally, the threshold may be an actually required threshold that is set after prediction results of occurrence of events of the multiple users are obtained, or may be a threshold that is configured in the combined prediction model in advance. This is not limited in this embodiment of the present disclosure.

For the network event prediction method provided in this embodiment of the present disclosure, a first probability value of occurrence of a first network event is determined according to signaling plane data of a user and a first supervised prediction model, a second probability value of occurrence of the first network event is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event, and reducing a cost of network operation and maintenance.

FIG. 6 is a schematic flowchart of a method 600 for establishing a network-event prediction model according to an embodiment of the present disclosure.

Step S610: Determine signaling sequence data of each first sample user according to signaling plane data and first label information of each of multiple first sample users, where the signaling plane data of each first sample user includes N pieces of signaling data and a timestamp of each of the N pieces of signaling data, each of the N pieces of signaling data includes a signaling type, the first label information of each first sample user is used to represent whether a first network event of each first sample user actually occurs, and N is a positive integer greater than or equal to 1.

Step S620: Train a first supervised prediction model according to the signaling sequence data and the first label information of each first sample user, where the first supervised prediction model represents a mapping relationship between the signaling sequence data of each first sample user and a probability value of occurrence of the first network event.

Step S630: Train a second supervised prediction model according to expert feature data and second label information of each of multiple second sample users, where the expert feature data of each second sample user represents a value of at least one preset feature of each second sample user, the second supervised prediction model represents a mapping relationship between the expert feature data of each second sample user and the probability value of occurrence of the first network event, and the second label information of each second sample user is used to represent whether the first network event of each second sample user actually occurs.

Further, user plane data of each of the multiple second sample users may include user data of communication between each second sample user and a network.

It should be understood that the multiple first sample users and the multiple second sample users may be same sample users, or may be different sample users, or may be partially same sample users. This is not limited in the present disclosure.

Step S640: Determine a first network-event prediction model according to the first supervised prediction model and the second supervised prediction model, where the first network-event prediction model is used to determine a predicted occurrence probability of the first network event.

Further, the event prediction model may be determined according to the first supervised prediction model, the second supervised prediction model, and a combined prediction model, where the combined prediction model represents a mapping relationship between a prediction result of occurrence of an event and a first probability value that is determined by the first supervised prediction model and that is of occurrence of an event and a second probability value that is determined by the second supervised prediction model and that is of occurrence of an event.

For the method for establishing a network-event prediction model provided in this embodiment of the present disclosure, a first supervised prediction model is trained according to signaling sequence data and first label information of each of multiple first sample users, a second supervised prediction model is trained according to user plane data and second label information of each of multiple second sample users, and a first network-event prediction model is determined according to the first supervised prediction model and the second supervised prediction model. The first network-event prediction model can determine a prediction result of a first network event, and the prediction result has a relatively high accuracy rate.

Further, in step S610, at each timestamp of at least one timestamp arranged in a time order, sampling is performed on the signaling data of communication between each of the multiple first sample users and the network to obtain the signaling plane data of each first sample user, where the signaling plane data of each first sample user includes N pieces of signaling data and a timestamp of each of the N pieces of signaling data, and each piece of signaling data includes at least one piece of signaling-related data. After special encoding processing is performed on each piece of signaling data using a signaling sequence construction operator, signaling corresponding to each piece of signaling data is obtained. First label information of each of the multiple first sample users is obtained from a first database, where the first label information of each first sample user is used to represent a result about whether the first network event of each first sample user actually occurs.

Optionally, M target signaling groups may be generated according to the N pieces of signaling of each of the multiple first sample users and the first label information of each first sample user, where each target signaling group of the M target signaling groups includes m pieces of target signaling that are arranged in a time order, a mapping relationship exists between the m pieces of target signaling that are arranged in a time order and the first label information, and M and m are both positive integers greater than or equal to 1.

It should be understood that the m pieces of target signaling that are arranged in a time order may be some signaling or all the signaling of the N pieces of signaling of each first sample user.

In an embodiment, it is assumed that a probability that signaling 121 and signaling 331 that are arranged in a time order appear in A first sample users who are labeled as 0 is 90%, and a probability that the signaling 121 and the signaling 331 that are arranged in a time order appear in B first sample users who are labeled as 1 is 5%. That is, the frequency/frequency of appearance in the A first sample users and the frequency/frequency of appearance in the B second sample users are obviously different, it may be regarded that the signaling 121 and the signaling 331 are target signaling. A group of the target signaling 121 and target signaling 331 is closely related to occurrence of the first network event, and has an effect of predicting whether the first network event is to occur, where A and B are both integers greater than or equal to 1.

Optionally, the target signaling may further be feature signaling or a feature sequence, and the target signaling group may further be a feature signaling group or a feature sequence group. This is not limited in this embodiment of the present disclosure.

In an embodiment, as shown in Table 4, target signaling 230, target signaling 131, and the target signaling 331 are arranged in a timestamp order, and have an effect of determining an occurrence probability of an event or whether the event is to occur. 230, 131, and 331 may be referred to as a target signaling sequence group. This is not limited in this embodiment of the present disclosure.

After the M target signaling groups and N pieces of signaling of each first sample user are determined, the signaling sequence data of each of the multiple first sample users may be generated according to the N pieces of signaling of each first sample user and the M target signaling groups. The signaling sequence data of each first sample user represents whether the N pieces of signaling of each first sample user include $m_i$ pieces of target signaling that are arranged in a time order, where an $i^{th}$ target signaling group of the M target signaling groups includes the $m_i$ pieces of target signaling that are arranged in a time order, i is less than or equal to M and is a positive integer greater than or equal to 1, and $m_i$ is a positive integer greater than or equal to 1.

Optionally, in the signaling sequence data of each first sample user, a numerical value 1 may be used to represent that all signaling of each first sample user includes target signaling of a target signaling group, that is, all the signaling of each first sample user includes all target signaling that is in the target signaling group and that is arranged in a time order. A numerical value 0 may be used to represent that all signaling of each first sample user does not include target signaling of the target signaling group, that is, all the signaling of each first sample user does not include each piece of target signaling in the target signaling group. Alternatively, although all the signaling of each first sample user includes each piece of target signaling in the target signaling group, each piece of target signaling in the target signaling group is not arranged in a time order. This is not limited in this embodiment of the present disclosure.

Further, in step S620, the first supervised prediction model trains an optimal model using the signaling sequence data of each of the multiple first sample users and the first label information corresponding to the signaling sequence data of each first sample user and using a supervised learning algorithm. This model belongs to a set of functions, and optimally represents that under an evaluation rule, an output closest to an actual result may be obtained according to an input such that signaling sequence data input by a to-be-tested user may be mapped to a correspondingly output probability value of occurrence of the first network event using the first supervised prediction model. Simple determining is performed on the output in order to obtain a prediction result about whether the first network event is to occur.

Optionally, the first supervised prediction model may be based on one or more supervised learning algorithms. The supervised learning algorithm may be, for example, a decision tree algorithm, a logic regression algorithm, a support vector machine algorithm, and a combined algorithm. This is not limited in this embodiment of the present disclosure.

Optionally, the first unsupervised prediction model may further be trained according to the signaling sequence data of each of the multiple first sample users, where the first unsupervised prediction model represents a mapping relationship between the signaling sequence data of each first sample user and a user cluster.

Optionally, the first unsupervised prediction model may calculate a degree of internal similarity between the signaling sequence data of each of the multiple first sample users using a clustering algorithm. For example, the first unsupervised prediction model may group, by calculating Euclidean distances between the multiple first sample users, the multiple first sample users into several subsets of first sample users. First sample users in each subset are similar, and first sample users in different subsets are not similar. Such a subset is referred to as a cluster. The first unsupervised prediction model may be used to determine, a unique cluster to which each first sample user belongs.

Optionally, the first unsupervised prediction model may train the model according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Further, in step S630, the user plane data of each of the multiple second sample users is determined from data stored in a second database, and the expert feature data of each second sample user is determined according to the user plane data of each sample user of the multiple second sample users. The expert feature data may be a numerical value of an expert feature of the user. The second database includes communication data of communication between each of the multiple second sample users and a network, and the communication data includes records of all operations of interaction between each second sample user and the network.

It should be understood that the second label information of each second sample user is used to represent a result of occurrence of an event of each second sample user. For example, when whether a user is to complain about an operator needs to be predicted, second label information of a second sample user may represent whether the second sample user is to make a complaint. In this case, the second label information may include 1 or 0, where 1 represents that a complaint is to be made, and 0 represents that no complaint is to be made, or the second label information may include another representation parameter used to represent a result of occurrence of an event. This is not limited in this embodiment of the present disclosure.

It should be further understood that the multiple first sample users and the multiple second sample users may be same sample users, or may be different sample users, or may be partially same sample users. The expert feature refers to a preset feature that is manually constructed based on understanding of different services and that is required by a specific service. This is not limited in the present disclosure.

Optionally, the user plane data of each second sample user may include a TCP connection request quantity and a TCP connection success quantity of each second sample user. In an optional embodiment, as shown in Table 7, the user plane data of each second sample user may further include a get transaction request quantity and a get transaction success quantity of each second sample user. In this embodiment of the present disclosure, the user plane data of each second sample user may also include other data, which may be determined according to a network event that actually needs to be predicted. This is not limited in this embodiment of the present disclosure.

In an embodiment, assuming that it is determined, according to a network event that actually needs to be predicted, that the expert feature is a TCP connection success rate, the expert feature data of the user may be a numerical value of a TCP connection success rate of the user. The TCP connection success rate may be a ratio of a TCP connection success quantity to a TCP connection request quantity. However, this is not limited in this embodiment of the present disclosure.

Further, after the expert feature data and the second label information of each second sample user are determined, the second supervised prediction model trains an optimal model according to the expert feature data of each of the multiple second sample users and the second label information corresponding to the expert feature data of each second sample user using a supervised learning algorithm. This model belongs to a set of functions, and optimally represents that under an evaluation rule, an output closest to an actual result may be obtained according to an input such that the expert feature data input by the to-be-tested user may be mapped using the second supervised prediction model to a correspondingly output probability value of occurrence of the first network event, and simple determining is performed on the output in order to obtain a prediction result about whether the first network event is to occur.

Optionally, the expert feature data of each of the multiple second sample users may be a numerical value of another expert feature determined according to an event that actually needs to be predicted, This is not limited in this embodiment of the present disclosure.

Optionally, the second supervised prediction model may be based on one or more supervised learning algorithms. The supervised learning algorithm may be, for example, a decision tree algorithm, a logic regression algorithm, a support vector machine algorithm, and a combined algorithm. This is not limited in this embodiment of the present disclosure.

Optionally, the second unsupervised prediction model may further be trained according to the expert feature data of each of the multiple second sample users, where the second unsupervised prediction model represents a mapping relationship between the expert feature data of each second sample user and a cluster of a user.

Further, the second unsupervised prediction model calculates, using the clustering algorithm, a degree of internal similarity between the expert feature data of each of the multiple second sample users. For example, the second unsupervised prediction model may group, by calculating Euclidean distances of the expert feature data between the multiple second sample users, the multiple second sample users into several subsets of second sample users. Second sample users in each subset are similar, and second sample users in different subsets are not similar. Such a subset is referred to as a cluster. The second unsupervised prediction model may be used to determine, a unique cluster to which each second sample user belongs.

Optionally, the second unsupervised prediction model may train the model according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Optionally, in a specific modeling process of the second supervised prediction model, the second unsupervised prediction model may further be trained according to signaling sequence data of the multiple first sample users, where the target signaling group that exists when the second unsupervised prediction model is trained using the signaling sequence data of the multiple first sample users is equivalent to the preset feature that exists when the second unsupervised prediction model is trained using the expert feature data. A specific training process is similar to the training process of the expert feature data. This is not limited in this embodiment of the present disclosure.

Further, in step S640, for multiple to-be-tested users, at least one first probability value and at least one second probability value of each to-be-tested user of the multiple to-be-tested users may be determined according to the first supervised prediction model and the second supervised prediction model and based on multiple supervised learning algorithms, and at least one first cluster and at least one second cluster of each to-be-tested user of the multiple to-be-tested users are determined according to the first unsupervised prediction model and the second unsupervised prediction model and based on multiple clustering algorithms in order to determine a function f. The function f is encoded and is used as an input of the combined prediction model. A function of the combined prediction model is optimized such that an error rate of the function of the combined prediction model is minimized in order to determine the probability value of occurrence of the first network event of each to-be-tested user of the multiple to-be-tested users. If a supervised prediction model or an unsupervised prediction model does not exist, a corresponding output of the combined prediction model is not used in the function f. This is not limited in this embodiment of the present disclosure.

In this embodiment of the present disclosure, the event prediction model may be determined according to the first supervised prediction model, the second supervised prediction model, and the combined prediction module. The combined prediction model represents a mapping between a probability value output by a supervised prediction model and a prediction result.

Optionally, in this embodiment of the present disclosure, the event prediction model may further be determined according to the first supervised prediction model, the second supervised prediction model, the first unsupervised prediction model, and the combined prediction model, and the combined prediction model represents a prediction result and a mapping between a probability value output by the supervised prediction model and a cluster output by an unsupervised prediction model.

Optionally, in this embodiment of the present disclosure, the event prediction model may further be determined according to the first supervised prediction model, the second supervised prediction model, the second unsupervised prediction model, and the combined prediction model, and the combined prediction model represents a prediction result and a mapping between a probability value output by the supervised prediction model and a cluster output by an unsupervised prediction model.

Optionally, in this embodiment of the present disclosure, the event prediction model may further be determined according to the first supervised prediction model, the second supervised prediction model, the first unsupervised prediction model, the second unsupervised prediction model, and the combined prediction model, where the combined prediction model represents a prediction result and a mapping between a probability value output by the supervised prediction model and a cluster output by an unsupervised prediction model. However, this is not limited in this embodiment of the present disclosure.

In an embodiment, in this embodiment of the present disclosure, according to a network-event prediction model, the probability value of occurrence of the first network event may be determined, or it may be determined whether the first network event is to occur.

In another embodiment, in this embodiment of the present disclosure, it may further be determined, according to the network-event prediction model, that a prediction result of occurrence of the first network event is one of multiple possible results of occurrence of the first network event. However, this is not limited in this embodiment of the present disclosure.

For the method for establishing a network-event prediction model provided in this embodiment of the present disclosure, a first supervised prediction model is trained according to signaling sequence data and first label information of each of multiple first sample users, a second supervised prediction model is trained according to user plane data and second label information of each of multiple second sample users, and a first network-event prediction model is determined according to the first supervised prediction model and the second supervised prediction model. The first network-event prediction model can determine a prediction result of occurrence of a first network event, and the prediction result has a relatively high accuracy rate. Moreover, a cost of network operation and maintenance can be reduced using the first network-event prediction model.

Figure 7:
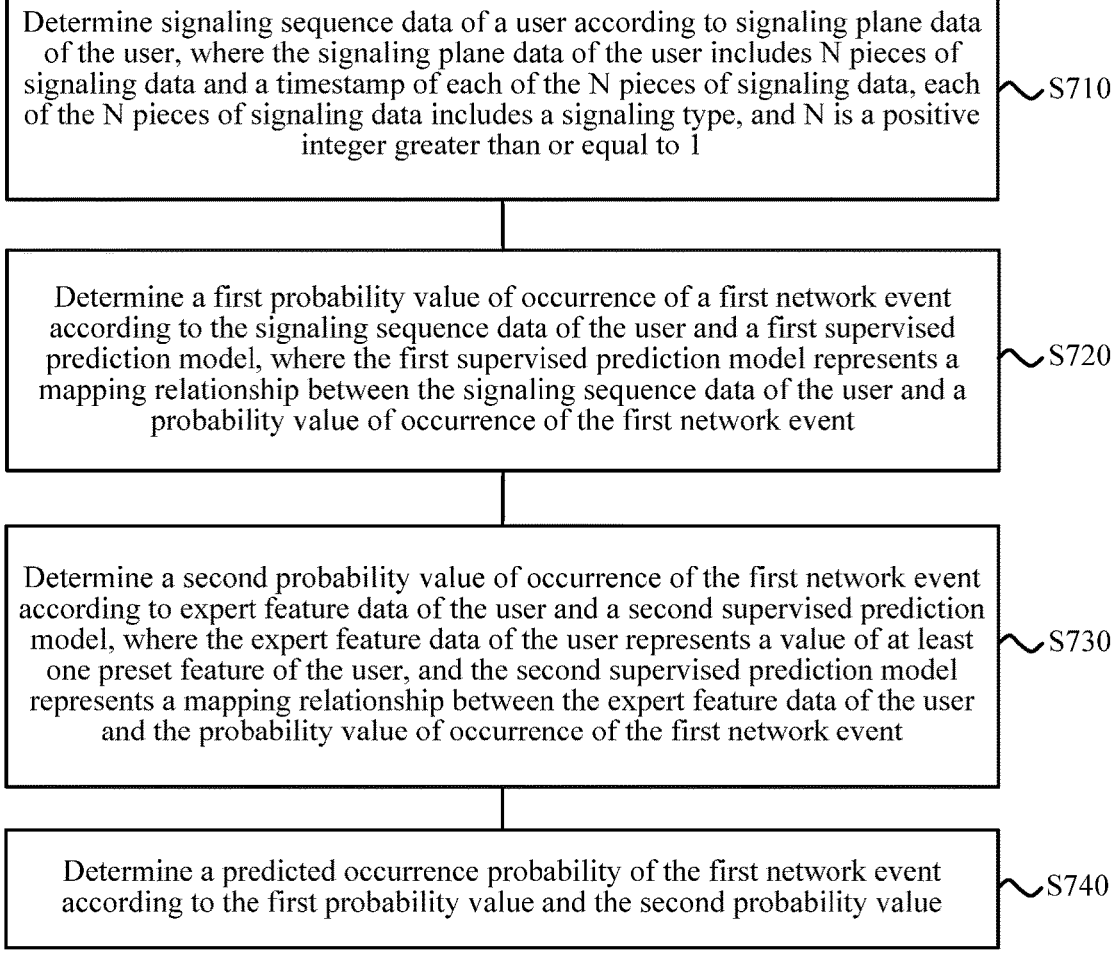
FIG. 7 is a schematic flowchart of a network-event prediction method according to an embodiment of the present disclosure.

FIG. 7 is a schematic flowchart of a network event prediction method 700 according to an embodiment of the present disclosure.

Step S710: Determine signaling sequence data of a user according to signaling plane data of the user, where the signaling plane data of the user includes N pieces of signaling data and a timestamp of each of the N pieces of signaling data, each of the N pieces of signaling data includes a signaling type, and N is a positive integer greater than or equal to 1.

It should be understood that the user herein may be a to-be-tested user, or another reference user. This is not limited in this embodiment of the present disclosure.

Step S720: Determine a first probability value of occurrence of a first network event according to the signaling sequence data of the user and a first supervised prediction model, where the first supervised prediction model represents a mapping relationship between the signaling sequence data of the user and a probability value of occurrence of the first network event.

Step S730: Determine a second probability value of occurrence of the first network event according to expert feature data of the user and a second supervised prediction model, where the expert feature data of the user represents a value of at least one preset feature of the user, and the second supervised prediction model represents a mapping relationship between the expert feature data of the user and a probability value of occurrence of the first network event.

Step S740: Determine a predicted occurrence probability of the first network event according to the first probability value and the second probability value.

For the network event prediction method provided in this embodiment of the present disclosure, a first probability value of occurrence of a first network event is determined according to signaling plane data of a user and a first supervised prediction model, a second probability value of occurrence of the first network event is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event, and reducing a cost of network operation and maintenance.

Further, in step S710, at each timestamp of at least one timestamp arranged in a time order, sampling is performed on the signaling data of communication between the to-be-tested user and a network to obtain the signaling plane data of the to-be-tested user, where the signaling plane data of the to-be-tested user includes N pieces of signaling data and a timestamp of each of the N pieces of signaling data, and each piece of signaling data includes at least one piece of signaling-related data. After special encoding processing is performed on each piece of signaling data using a signaling sequence construction operator, signaling corresponding to each piece of signaling data is obtained.

It should be understood that the signaling data in this embodiment of the present disclosure may further include an access network type and an attachment success mark, or may further include other data, which may be determined according to an event that actually needs to be predicted. This is not limited in this embodiment of the present disclosure.

Optionally, the signaling data may include a signaling type. The signaling type may be represented using a numerical value. Each numerical value corresponds to a signaling type. However, the signaling type may also be represented using another form. In another optional embodiment, as shown in Table 1, the signaling data may further include an access network type and an attachment success mark, where the access network type may be 2G, 3G or 4G, and may be represented using a numerical value. For example, 1 may be used to represent a 2G network, 2 may be used to represent a 3G network, and 3 may be used to represent a 4G network. However, this is not limited in this embodiment of the present disclosure. The attachment success mark may be used to represent that signaling is successfully received by the receive end. In Table 1, 0 is used to represent a reception failure, and 1 is used to represent a reception success. However, another manner may be used for representation. This is not limited in this embodiment of the present disclosure.

It should be understood that this embodiment of the present disclosure is described using an example in which signaling data includes a signaling type, an access network type, and an attachment success mark. In this embodiment of the present disclosure, the signaling data may also include other data, which may be further determined according to a network event that actually needs to be predicted. This is not limited in this embodiment of the present disclosure.

Optionally, signaling-related data in each piece of signaling data may be bonded together, to obtain signaling corresponding to the signaling data. This is not limited in this embodiment of the present disclosure.

Further, after N pieces of signaling of the to-be-tested user are determined, signaling sequence data of the to-be-tested user may be determined according to the N pieces of signaling of the to-be-tested user and at least one preset signaling group. The signaling sequence data of the to-be-tested user represents whether the N pieces of signaling of the to-be-tested user include $m_i$ pieces of preset signaling that are arranged in a time order, where an $i^{th}$ preset signaling group of M preset signaling groups includes the $m_i$ pieces of preset signaling that are arranged in a time order, i is less than or equal to M and is a positive integer greater than or equal to 1, and $m_i$ is a positive integer greater than or equal to 1.

In an embodiment, assuming that all signaling corresponding to the to-be-tested user is $S_1, S_2, \ldots,$ and $S_N$, timestamps corresponding to the signaling of all the signaling of the to-be-tested user are $T_1, T_2, \ldots,$ and $T_N$. The signaling-sequence-data generation module includes target signaling $S_{i_1}, S_{i_2}, \ldots,$ and $S_{i_M}$ that is arranged in a time order, where $1 \leq i_1 < i_2 < \ldots < i_M \leq N$, and $p \geq 1$. Assuming that a quantity of target signaling sequence groups is p, the signaling sequence data of the to-be-tested user may be represented using a vector $(X_1^{(S)}, X_2^{(S)}, X_p^{(s)})$.

Optionally, as shown in Table 13, in the signaling sequence data of the to-be-tested user, a numerical value 1 may be used to represent that all the signaling of the to-be-tested user includes preset signaling in a preset signaling group, that is, all the signaling of each first sample user includes all preset signaling that is arranged in a time order in the preset signaling group. A numerical value 0 may be used to represent that all signaling of the to-be-tested user does not include preset signaling in a preset signaling group, that is, all the signaling of the to-be-tested user does not include each piece of preset signaling in the preset signaling group. Alternatively, although all the signaling of the to-be-tested user includes each piece of preset signaling in the preset signaling group, each piece of preset signaling in the preset signaling group is not arranged in a time order. This is not limited in this embodiment of the present disclosure.

Further, in step S720, a first probability value of occurrence of the first network event of the to-be-tested user is determined according to the signaling sequence data of the to-be-tested user and the first supervised prediction model, where the first supervised prediction model represents a mapping relationship between the signaling sequence data of the to-be-tested user and the probability value of occurrence of the first network event.

Optionally, before step S720, the first supervised prediction model may be trained according to signaling sequence data and first label information of each of multiple first sample users.

Optionally, the first supervised prediction model may determine the probability value of occurrence of the first network event of the to-be-tested user according to one or more supervised learning algorithms. The supervised learning algorithm may be, for example, a decision tree algorithm, a logic regression algorithm, a support vector machine algorithm, and a combined algorithm. This is not limited in this embodiment of the present disclosure.

Optionally, a first cluster to which the to-be-tested user belongs may be determined according to the signaling sequence data of the to-be-tested user and first unsupervised prediction model, where the first unsupervised prediction model represents a mapping relationship between the signaling sequence data of the to-be-tested user and a user cluster.

Optionally, before step S720, the first unsupervised prediction model may be trained according to the signaling sequence data of each of the multiple first sample users.

Optionally, the first unsupervised prediction model may determine a cluster of occurrence of the event of the to-be-tested user according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Further, in step S730, user plane data of the to-be-tested user is determined from data stored in a user database, the expert feature data of the to-be-tested user is determined according to the user plane data of the to-be-tested user, and a second probability value of occurrence of an event of the to-be-tested user is determined according to the expert feature data of the to-be-tested user and a second supervised prediction model, where the second supervised prediction model represents a mapping relationship between the expert feature data of the to-be-tested user and a probability value of occurrence of a network event.

It should be understood that the user database includes communication data of communication between the to-be-tested user and the network, and the communication data includes records of all operations of interaction between the to-be-tested user and the network.

It should be further understood that the multiple first sample users and multiple second sample users may be same sample users, or may be different sample users, or may be partially same sample users. The expert feature refers to a preset feature that is manually constructed based on understanding of different services and that is required by a specific service. This is not limited in the present disclosure.

Further, the expert feature data of the to-be-tested user may be a value of a preset feature determined in the user plane data of the to-be-tested user. For example, assuming that it is determined, according to an event that actually needs to be predicted, that the preset feature is a TCP connection success rate, the expert feature data of the to-be-tested user may be a numerical value of a TCP connection success rate of the to-be-tested user, or an expert feature that is required may further be determined according to an event that actually needs to be predicted. However, this is not limited in this embodiment of the present disclosure.

In an embodiment, assuming that a quantity of expert features is q, the expert feature data of the user may be represented using a vector $(X_1^{(E)}, X_2^{(E)}, \ldots, X_p^{(E)})$, where $q \geq 1$.

Optionally, before step S730, the second supervised prediction model may be trained according to the expert feature data and second label information of each of the multiple second sample users.

Optionally, the second supervised prediction model may determine a probability value of occurrence of the event of the to-be-tested user according to one or more supervised learning algorithms. The supervised learning algorithm may be, for example, a decision tree algorithm, a logic regression algorithm, a support vector machine algorithm, and a combined algorithm. This is not limited in this embodiment of the present disclosure.

Optionally, a second cluster to which the to-be-tested user belongs may be determined according to the expert feature data of the to-be-tested user and second unsupervised prediction model, where the second unsupervised prediction model represents a mapping relationship between the expert feature data of the to-be-tested user and a user cluster.

Optionally, before step S730, the second unsupervised prediction model may be trained according to the expert feature data of each of the multiple second sample users.

Optionally, the second unsupervised prediction model may determine a cluster of occurrence of the event of the to-be-tested user according to one or more unsupervised learning algorithms. The unsupervised learning algorithm may be, for example, a hierarchical clustering algorithm, a K-means algorithm, and an image-based clustering algorithm. This is not limited in this embodiment of the present disclosure.

Optionally, before step S740, when an interval between a time of obtaining the first probability value and a time of obtaining the second probability value exceeds a threshold, time alignment processing is performed on a probability value of the first probability value and the second probability value that is obtained later, and miss-value imputation processing is performed on the probability value that is obtained later and that has undergone the time alignment processing.

Further, it is assumed that first probability values that are determined by the first supervised prediction model and that are of the reference user 1, the reference user 2, the reference user 3, and the to-be-tested user are respectively M1, M2 and, M4, where M1, M2 and M4 may be first probability values that are determined by the first supervised prediction model using different supervised learning algorithms. Second probability values that are determined by the second supervised prediction model and that are of the reference user 1, the reference user 2, the reference user 3, and the to-be-tested user are M3. As shown in Table 16, because an interval between a time of obtaining the first probability value of the to-be-tested user by the first supervised prediction model and a time of obtaining the second probability value of the to-be-tested user exceeds a threshold, and the time of obtaining the first probability value of the to-be-tested user is earlier than the time of obtaining the second probability value of the to-be-tested user, in this case, time alignment processing may be performed on the second probability value M3 of the to-be-tested user, and miss-value imputation is performed on M3 according to a first probability value and a second probability value of another user.

It should be understood that because of problems such as a data heterogeneousness problem, a synchronousness problem of data/models, or a data privacy problem, a miss also occurs in a first probability value and a second probability value output by a supervised prediction model. This is not limited in this embodiment of the present disclosure.

It should be further understood that the reference user 1, the reference user 2, and the reference user 3 herein may be to-be-tested users other than the to-be-tested user, and the reference user 1, the reference user 2, and the reference user 3 do not have a miss of a probability value. This is not limited in this embodiment of the present disclosure. In an optional embodiment, as shown in Table 16, for a value of M3 of the to-be-tested user, Euclidean distances between the vector 1, the vector 2, the vector 3, and the vector x may be determined according to a vector 1 that is generated from values of M1, M2, and M4 of the reference user 1, a vector 2 that is generated from values of M1, M2, and M4 of the reference user 2, a vector 3 that is generated from values of M1, M2, and M4 of the reference user 3, and a vector x that is generated from values of M1, M2, and M4 of the to-be-tested user. According to values of the Euclidean distances between the vectors, it is determined that the to-be-tested user is close to one reference user of the reference user 1, the reference user 2, or the reference user 3. Assuming that the reference user 1 is close to the to-be-tested user, the value of M3 of the reference user 1 is determined to be the value of M3 that is missing of the to-be-tested user. However, this is not limited in this embodiment of the present disclosure.

Optionally, a miss of a user cluster may similarly occur in an output of an unsupervised prediction model. An alignment/miss-value processing module may similarly encode a reference type that is output by the unsupervised prediction model and that is of each reference user. Inference is performed for a missing cluster. This is not limited in this embodiment of the present disclosure.

Further, in step S740, for multiple users, at least one first probability value and at least one second probability value of each user of the multiple users may be determined according to the first supervised prediction model and the second supervised prediction model and based on multiple supervised learning algorithms, and at least one first cluster and at least one second cluster of each user of the multiple users are determined according to the first unsupervised prediction model and the second unsupervised prediction model and based on multiple clustering algorithms in order to determine a function f. The function f is encoded and is used as an input of the combined prediction model. A function of the combined prediction model is optimized such that an error rate of the function of the combined prediction model is minimized in order to determine a prediction result of occurrence of the event of each user of multiple users. If a supervised prediction model or an unsupervised prediction model does not exist, a corresponding output of the model is not used in the function f. This is not limited in this embodiment of the present disclosure.

Optionally, the combined prediction model may determine a prediction result of occurrence of the event of the to-be-tested user according to only the first probability value, the second probability value, and the combined prediction model, may further determine a prediction result of occurrence of the event of the to-be-tested user according to the first probability value, the second probability value, the first cluster, and the combined prediction model, may further determine a prediction result of occurrence of the event of the to-be-tested user according to the first probability value, the second probability value, the second cluster, and the combined prediction model, or may further determine a prediction result of occurrence of the event of the to-be-tested user according to the first probability value, the second probability value, the first cluster, the second cluster, and the combined prediction model. This is not limited in this embodiment of the present disclosure.

Optionally, the combined prediction model may determine the predicted occurrence probability of the first network event of the to-be-tested user according to only weighting, averaging or another calculation rule of the first probability value and the second probability value.

Optionally, the combined prediction model may further determine the predicted occurrence probability of the first network event of the to-be-tested user according to the first probability value, the second probability value, and the first cluster to which the to-be-tested user belongs.

Optionally, the combined prediction model may further determine the predicted occurrence probability of the first network event of the to-be-tested user according to the first probability value, the second probability value, and the second cluster to which the to-be-tested user belongs.

Optionally, the combined prediction model may further determine the predicted occurrence probability of the first network event of the to-be-tested user according to the first probability value, the second probability value, and the first cluster and the second cluster to which the to-be-tested user belongs. This is not limited in this embodiment of the present disclosure.

It should be understood that the combined prediction model may determine the probability value of occurrence of the first network event, and may determine, according to the probability value, whether the first network event is to occur, or may determine that the prediction result of the occurrence of the first network event is one of multiple possible results of occurrence of the first network event. However, this is not limited in this embodiment of the present disclosure.

Optionally, when multiple to-be-tested users exist, the predicted occurrence probability of the first network event of each to-be-tested user of multiple to-be-tested users is determined using a network-event prediction model. After it is determined, according to the predicted occurrence probability of the first network event of each to-be-tested user, whether the first network event is to occur, an actual result of occurrence of the event of each to-be-tested user may be obtained. A prediction accuracy rate is determined according to a prediction result of occurrence of the event of each user and an actual result of occurrence of the event of each user. When the prediction accuracy rate is less than a threshold, at least one of the first supervised prediction model or the second supervised prediction model is updated.

For the network event prediction method provided in this embodiment of the present disclosure, a first probability value of occurrence of a first network event is determined according to signaling plane data of a user and a first supervised prediction model, a second probability value of occurrence of the first network event is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event, and reducing a cost of network operation and maintenance.

The method for establishing a network-event prediction model and the network event prediction method in the embodiments of the present disclosure are described above with reference to FIG. 6 and FIG. 7. An apparatus for establishing a network-event prediction model and a network event prediction apparatus in the embodiments of the present disclosure are described below with reference to FIG. 8 to FIG. 11. It should be noted that, these examples are merely used to help a person skilled in the art to understand and implement the embodiments of the present disclosure, rather than to limit the scope of the embodiments of the present disclosure. A person skilled in the art may make equivalent variations or changes according to the examples provided herein. Such variations or changes shall still fall within the scope of the embodiments of the present disclosure.

Figure 8:
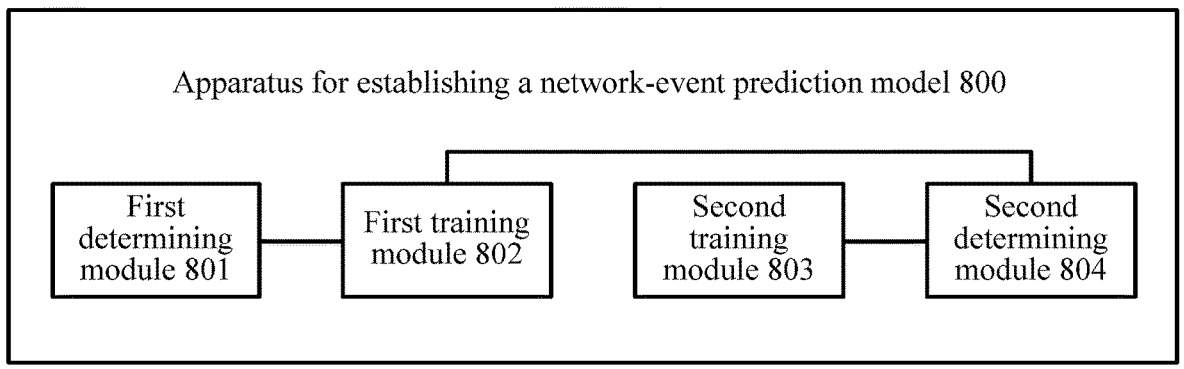
FIG. 8 is a schematic block diagram of an apparatus for establishing a network-event prediction model according to an embodiment of the present disclosure.

FIG. 8 is a schematic block diagram of an apparatus for establishing a network event prediction model according to an embodiment of the present disclosure. As shown in FIG. 8, the apparatus 800 includes a first determining module 801, a first training module 802, a second training module 803, and a second determining module 804.

The first determining module 801 is configured to determine signaling sequence data of each first sample user according to signaling plane data and first label information of each of multiple first sample users, where the signaling plane data of each first sample user includes N pieces of signaling data and a timestamp of each of the N pieces of signaling data, each of the N pieces of signaling data includes a signaling type, the first label information of each first sample user is used to represent whether a first network event of each first sample user actually occurs, and N is a positive integer greater than or equal to 1.

The first training module 802 is configured to train a first supervised prediction model according to the signaling sequence data that is determined by the first determining module 801 and that is of each first sample user and the first label information, where the first supervised prediction model represents a mapping relationship between the signaling sequence data of each first sample user and a probability value of occurrence of the first network event.

The second training module 803 is configured to train a second supervised prediction model according to expert feature data and second label information of each of multiple second sample users, where the expert feature data of each second sample user represents a value of at least one preset feature of each second sample user, the second supervised prediction model represents a mapping relationship between the expert feature data of each second sample user and the probability value of occurrence of the first network event, and the second label information of each second sample user is used to represent whether the first network event of each second sample user actually occurs.

The second determining module 804 is configured to determine a first network-event prediction model according to the first supervised prediction model trained by the first training module 802 and the second supervised prediction model trained by the second training module 803, where the first network-event prediction model is used to determine a predicted occurrence probability of the first network event.

For the method for establishing a network-event prediction model provided in this embodiment of the present disclosure, a first supervised prediction model is trained according to signaling sequence data and first label information of each of multiple first sample users, a second supervised prediction model is trained according to user plane data and second label information of each of multiple second sample users, and a first network-event prediction model is determined according to the first supervised prediction model and the second supervised prediction model. The first network-event prediction model can determine a prediction result of a first network event, and the prediction result has a relatively high accuracy rate.

Optionally, in an embodiment, the first determining module 801 is further configured to determine, according to the signaling plane data of each of the multiple first sample users, N pieces of signaling that correspond one-to-one to the N pieces of signaling data of each first sample user, determine M target signaling groups according to the N pieces of signaling of each first sample user and the first label information of each first sample user, where each target signaling group of the M target signaling groups includes m pieces of target signaling that are arranged in a time order, a mapping relationship exists between the m pieces of target signaling that are arranged in a time order and the first label information, and M and m are both positive integers greater than or equal to 1, and determine the signaling sequence data of each first sample user according to the M target signaling groups and the N pieces of signaling of each first sample user, where the signaling sequence data of each first sample user represents whether the N pieces of signaling of each first sample user include $m_i$ pieces of target signaling that are arranged in a time order, an $i^{th}$ target signaling group of the M target signaling groups includes the $m_i$ pieces of target signaling that are arranged in a time order, i is less than or equal to M and is a positive integer greater than or equal to 1, and $m_i$ is a positive integer greater than or equal to 1.

Optionally, in another embodiment, the first training module 802 is further configured to train the first unsupervised prediction model according to the signaling sequence data of each of the multiple first sample users, where the first unsupervised prediction model represents a mapping relationship between the signaling sequence data of each first sample user and a user cluster, and the second determining module 804 is further configured to determine the first network-event prediction model according to the first supervised prediction model, the second supervised prediction model, and the first unsupervised prediction model.

Optionally, in another embodiment, the second training module 803 is further configured to train the second unsupervised prediction model according to the expert feature data of each of the multiple second sample users, where the second unsupervised prediction model represents a mapping relationship between the expert feature data of each second sample user and a user cluster, and the second determining module 804 is further configured to determine the first network-event prediction model according to the first supervised prediction model, the second supervised prediction model, and the second unsupervised prediction model.

For the method for establishing a network-event prediction model provided in this embodiment of the present disclosure, a first supervised prediction model is trained according to signaling sequence data and first label information of each of multiple first sample users, a second supervised prediction model is trained according to user plane data and second label information of each of multiple second sample users, and a first network-event prediction model is determined according to the first supervised prediction model and the second supervised prediction model. The first network-event prediction model can determine a prediction result of a first network event, and the prediction result has a relatively high accuracy rate. Moreover, a cost of network operation and maintenance can be reduced using the first network-event prediction model.

Figure 9:
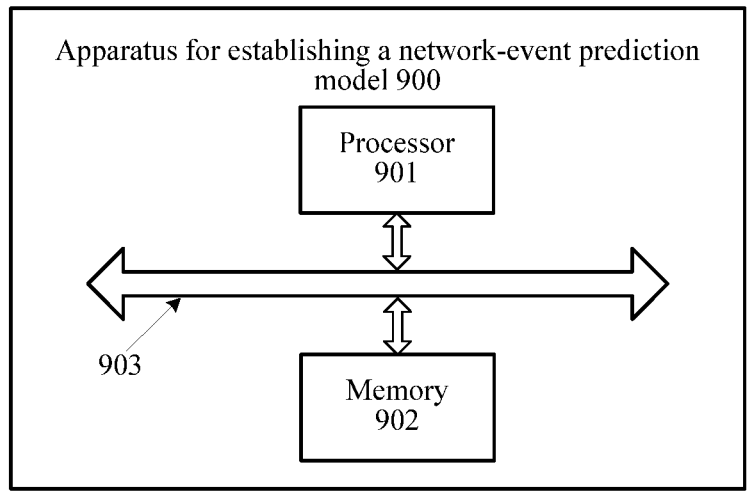
FIG. 9 is another schematic block diagram of an apparatus for establishing a network-event prediction model according to an embodiment of the present disclosure.

It should be noted that, in this embodiment of the present disclosure, the first determining module 801, the first training module 802, the second training module 803, and the second determining module 804 may be implemented using a processor. As shown in FIG. 9, an apparatus for establishing a network-event prediction model 900 may include a processor 901 and a memory 902, where the memory 902 may be configured to store code to be executed by the processor 901.

Components in the apparatus 900 are coupled using a bus system 903. The bus system 903 further includes a power supply bus, a control bus, and a status signal bus in addition to a data bus.

It should be understood that the apparatuses for establishing a network-event prediction model in the embodiments of the present disclosure described in FIG. 8 and FIG. 9 can implement the steps of the method in FIG. 6. To avoid repetition, details are no longer described herein.

Figure 10:
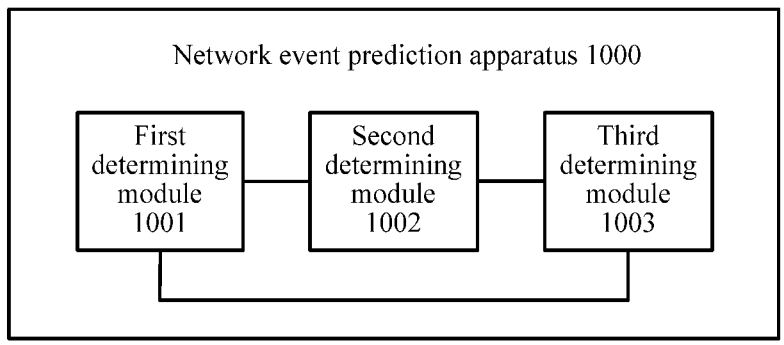
FIG. 10 is a schematic block diagram of a network event prediction apparatus according to an embodiment of the present disclosure.

FIG. 10 is a schematic block diagram of a network event prediction apparatus 1000 according to an embodiment of the present disclosure. As shown in FIG. 10, the apparatus 1000 includes a first determining module 1001, a second determining module 1002, and a third determining module 1003.

The first determining module 1001 is configured to determine signaling sequence data of a user according to signaling plane data of the user, where the signaling plane data of the user includes N pieces of signaling data and a timestamp of each of the N pieces of signaling data, each of the N pieces of signaling data includes a signaling type, and N is a positive integer greater than or equal to 1.

The first determining module 1001 is further configured to determine a first probability value of occurrence of a first network event according to the signaling sequence data of the user and a first supervised prediction model, where the first supervised prediction model represents a mapping relationship between the signaling sequence data of the user and a probability value of occurrence of the first network event.

The second determining module 1002 is configured to determine a second probability value of occurrence of the first network event according to expert feature data of the user and a second supervised prediction model, where the expert feature data of the user represents a value of at least one preset feature of the user, and the second supervised prediction model represents a mapping relationship between the expert feature data of the user and a probability value of occurrence of the first network event.

The third determining module 1003 is configured to determine a predicted occurrence probability of the first network event according to the first probability value determined by the first determining module 1001 and the second probability value determined by the second determining module 1002.

For the network event prediction apparatus provided in this embodiment of the present disclosure, a first probability value of occurrence of a first network event is determined according to signaling plane data of a user and a first supervised prediction model, a second probability value of occurrence of the first network event is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event.

Optionally, in an embodiment, the first determining module 1001 is further configured to determine, according to the N pieces of signaling data of the user, N pieces of signaling that correspond one-to-one to the N pieces of signaling data, and determine the signaling sequence data of the user according to M preset signaling groups and the N pieces of signaling, where the signaling sequence data of the user represents whether the N pieces of signaling include $m_i$ pieces of preset signaling that are arranged in a time order, an $i^{th}$ preset signaling group of the M preset signaling groups includes the $m_i$ pieces of preset signaling that are arranged in a time order, i is less than or equal to M and is a positive integer greater than or equal to 1, and $m_i$ is a positive integer greater than or equal to 1.

Optionally, in another embodiment, the first determining module 1001 is further configured to determine, according to the signaling sequence data of the user and a first unsupervised prediction model, a first cluster to which the user belongs, where the first unsupervised prediction model represents a mapping relationship between the signaling sequence data of the user and a user cluster, and the first cluster belongs to the user cluster, and the third determining module 1003 is further configured to determine the predicted occurrence probability of the first network event according to the first probability value, the second probability value, and the first cluster.

Optionally, in another embodiment, the second determining module 1002 is further configured to determine, according to the expert feature data of the user and a second unsupervised prediction model, a second cluster to which the user belongs, where the second unsupervised prediction model represents a mapping relationship between the expert feature data of the user and a user cluster, and the second cluster belongs to the user cluster, and the third determining module 1003 is further configured to determine the predicted occurrence probability of the first network event according to the first probability value, the second probability value, and the second cluster.

Optionally, in another embodiment, the network event prediction apparatus further includes an obtaining module and an update module, where the third determining module 1003 is further configured to determine a prediction result of the first network event according to the predicted occurrence probability of the first network event, where the prediction result of the first network event represents whether the first network event is to occur, the obtaining module is configured to obtain an actual result of occurrence of the first network event, where the actual result of occurrence of the first network event represents whether the first network event actually occurs, the third determining module 1003 is further configured to determine a prediction accuracy rate of the first network event according to the prediction result of the first network event and the actual result of occurrence of the first network event, and the update module is configured to when the prediction accuracy rate of the first network event is less than a threshold, update at least one of the first supervised prediction model or the second supervised prediction model.

For the network event prediction apparatus provided in this embodiment of the present disclosure, a first probability value of occurrence of a first network event is determined according to signaling plane data of a user and a first supervised prediction model, a second probability value of occurrence of the first network event is determined according to expert feature data of the user and a second supervised prediction model, and a prediction result of occurrence of the event of the user is determined according to the first probability value and the second probability value. A network event is predicted using different types of data, thereby improving a prediction accuracy rate of a network event, and reducing a cost of network operation and maintenance.

Figure 11:
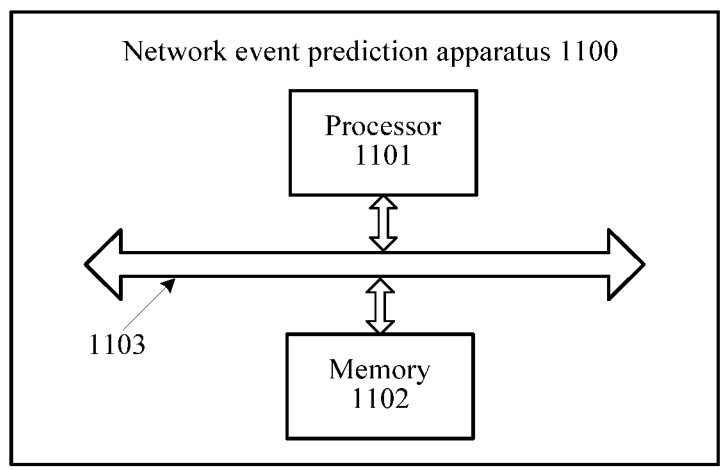
FIG. 11 is another schematic block diagram of a network event prediction apparatus according to an embodiment of the present disclosure.

It should be noted that, in this embodiment of the present disclosure, the first determining module 1001, the second determining module 1002, and the third determining module 1003 may be implemented using a processor. As shown in FIG. 11, the network event prediction apparatus 1100 may include a processor 1101 and a memory 1102, where the memory 1102 may be configured to store code to be executed by the processor 1101.

Components in the apparatus 1100 are coupled using a bus system 1103. The bus system 1103 further includes a power supply bus, a control bus, and a status signal bus in addition to a data bus.

It should be understood that the network event prediction apparatuses in the embodiments of the present disclosure described in FIG. 10 and FIG. 11 can implement the steps of the method in FIG. 7. To avoid repetition, details are no longer described herein.

It should be noted that, the foregoing method embodiments of the present disclosure may be applied in a processor, or may be implemented using a processor. The processor may be an integrated circuit chip and have a signal processing capability. In an implementation process, steps in the foregoing method embodiments can be implemented using a hardware integrated logical circuit in the processor, or using instructions in a form of software. The processor may be a general purpose processor, a digital signal processor (DSP), an application specific integrated circuit (ASIC), a field programmable gate array (FPGA), or another programmable logical device, a discrete gate or transistor logic device, or a discrete hardware component. The processor may implement or execute methods, steps, and logical block diagrams disclosed in the embodiments of the present disclosure. The general purpose processor may be a microprocessor or the processor may be any conventional processor or the like. Steps of the methods disclosed with reference to the embodiments of the present disclosure may be directly executed and completed by a hardware decoding processor, or may be executed and completed using a combination of hardware and software modules in the decoding processor. A software module may be located in a mature storage medium in the art, such as a random access memory (RAM), a flash memory, a read-only memory (ROM), a programmable ROM (PROM), an electrically erasable PROM (EEPROM), a register, or the like. The storage medium is located in the memory, and a processor reads information in the memory and completes the steps in the foregoing methods in combination with hardware of the processor.

It may be understood that, the memory in this embodiment of the present disclosure may be a volatile memory or a non-volatile memory, or may include both a volatile memory and a non-volatile memory. The non-volatile memory may be a ROM, a PROM, an erasable PROM (EPROM), an EEPROM or a flash memory. The volatile memory may be a RAM, and is used as an external cache. By means of exemplary description rather than limitative description, many forms of RAMs can be used. The RAMs are, for example, a static RAM (SRAM), a dynamic RAM (DRAM), a synchronous dynamic RAM (SDRAM), a double data rate SDRAM (DDR SDRAM), an enhanced SDRAM (ESDRAM) a synchlink DRAM (SLDRAM), and a Direct Rambus RAM (DR RAM). It should be noted that, the memory in the systems and methods described herein intends to include, but is not limited to, these and any other suitable type of memory.

It should be understood that sequence numbers of the foregoing processes do not mean execution sequences in various embodiments of the present disclosure. The execution sequences of the processes should be determined according to functions and internal logic of the processes, and should not be construed as any limitation on the implementation processes of the embodiments of the present disclosure.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network event prediction method, comprising:
    determining signaling sequence data of a user according to signaling plane data of the user, wherein the signaling plane data comprises N pieces of signaling data and a timestamp of each of the N pieces of the signaling data, wherein each of the N pieces comprises a signaling type, and wherein N comprises a positive integer greater than or equal to one;
    determining a first probability value of occurrence of a first network event according to the signaling sequence data and a first supervised prediction model, wherein the first supervised prediction model represents a mapping relationship between the signaling sequence data and the first probability value;
    determining a second probability value of the occurrence of the first network event according to expert feature data of the user and a second supervised prediction model, wherein the expert feature data represents a value of at least one preset feature of the user, and wherein the second supervised prediction model represents a mapping relationship between the expert feature data and the second probability value;
    determining a predicted occurrence probability of the first network event according to the first probability value and the second probability value; and
    sending the predicted occurrence probability to a network administrator.

2. The method of claim 1, wherein determining the signaling sequence data of the user comprises:
    determining, according to the N pieces of the signaling data, N pieces of signaling corresponding one-to-one to the N pieces of the signaling data; and
    determining the signaling sequence data according to M preset signaling groups and the N pieces of the signaling, wherein the signaling sequence data represents whether the N pieces of the signaling comprise $m_i$ pieces of preset signaling arranged in a time order, wherein an $i^{th}$ preset signaling group of the M preset signaling groups comprises the $m_i$ pieces of the preset signaling arranged in the time order, wherein an i is less than or equal to the M and a positive integer greater than or equal to one, and wherein the $m_i$ comprises a positive integer greater than or equal to one.

3. The method of claim 1, wherein before determining the predicted occurrence probability of the first network event, the method further comprises determining, according to the signaling sequence data and a first unsupervised prediction model, a first cluster to which the user belongs, wherein the first unsupervised prediction model represents a mapping relationship between the signaling sequence data and a user cluster, wherein the first cluster belongs to the user cluster, and wherein determining the predicted occurrence probability of the first network event comprises determining the predicted occurrence probability of the first network event according to the first probability value, the second probability value, and the first cluster.

4. The method of claim 1, wherein before determining the predicted occurrence probability of the first network event, the method further comprises determining, according to the expert feature data and a second unsupervised prediction model, a second cluster to which the user belongs, wherein the second unsupervised prediction model represents a mapping relationship between the expert feature data and a user cluster, wherein the second cluster belongs to the user cluster, and wherein determining the predicted occurrence probability of the first network event comprises determining the predicted occurrence probability of the first network event according to the first probability value, the second probability value, and the second cluster.

5. The method of claim 1, further comprising:
    determining a prediction result of the first network event according to the predicted occurrence probability, wherein the prediction result represents whether the first network event is to occur;
    obtaining an actual result of the occurrence of the first network event representing whether the first network event actually occurs;
    determining a prediction accuracy rate of the first network event according to the prediction result and the actual result; and
    updating at least one of the first supervised prediction model or the second supervised prediction model when the prediction accuracy rate is less than a threshold.

6. The method of claim 1, wherein the timestamp comprises a start time of signaling transmission.

7. The method of claim 1, wherein the timestamp comprises an end time of signaling transmission.

8. The method of claim 1, wherein the signaling data comprises an access network type.

9. The method of claim 1, wherein the signaling data comprises an attachment success mark.

10. A network event prediction apparatus, comprising:
    a memory comprising instructions; and
    a processor coupled to the memory, the instructions causing the processor to be configured to:
        determine signaling sequence data of a user according to signaling plane data of the user, wherein the signaling plane data comprises N pieces of signaling data and a timestamp of each of the N pieces of the signaling data, wherein each of the N pieces of the signaling data comprises a signaling type, and wherein N comprises a positive integer greater than or equal to one;
        determine a first probability value of occurrence of a first network event according to the signaling sequence data and a first supervised prediction model, wherein the first supervised prediction model represents a mapping relationship between the signaling sequence data and the first probability value of the occurrence of the first network event;
        determine a second probability value of the occurrence of the first network event according to expert feature data of the user and a second supervised prediction model, wherein the expert feature data represents a value of at least one preset feature of the user, and wherein the second supervised prediction model represents a mapping relationship between the expert feature data and the second probability value;
        determine a predicted occurrence probability of the first network event according to the first probability value and the second probability value; and
        send the predicted occurrence probability of the first network event to a network administrator.

11. The apparatus of claim 10, wherein the instructions further cause the processor to be configured to:
    determine, according to the N pieces of the signaling data of the user, N pieces of signaling corresponding one-to-one to the N pieces of the signaling data; and
    determine the signaling sequence data of the user according to M preset signaling groups and the N pieces of the signaling, wherein the signaling sequence data of the user represents whether the N pieces of the signaling comprise $m_i$ pieces of preset signaling arranged in a time order, wherein an $i^{th}$ preset signaling group of the M preset signaling groups comprises the $m_i$ pieces of the preset signaling arranged in the time order, wherein an i is less than or equal to the M and a positive integer greater than or equal to one, and wherein the $m_i$ comprises a positive integer greater than or equal to one.

12. The apparatus of claim 10, wherein the instructions further cause the processor to be configured to:
   determine, according to the signaling sequence data and a first unsupervised prediction model, a first cluster to which the user belongs, wherein the first unsupervised prediction model represents a mapping relationship between the signaling sequence data and a user cluster, and wherein the first cluster belongs to the user cluster; and
   determine the predicted occurrence probability of the first network event according to the first probability value, the second probability value, and the first cluster.

13. The apparatus of claim 10, wherein the instructions further cause the processor to be configured to:
   determine, according to the expert feature data and a second unsupervised prediction model, a second cluster to which the user belongs, wherein the second unsupervised prediction model represents a mapping relationship between the expert feature data and a user cluster, and wherein the second cluster belongs to the user cluster; and
   determine the predicted occurrence probability of the first network event according to the first probability value, the second probability value, and the second cluster.

14. The apparatus of claim 10, wherein the instructions further cause the processor to be configured to:
   determine a prediction result of the first network event according to the predicted occurrence probability, wherein the prediction result represents whether the first network event is to occur;
   obtain an actual result of the occurrence of the first network event representing whether the first network event actually occurs;
   determine a prediction accuracy rate of the first network event according to the prediction result and the actual result; and
   update the first supervised prediction model when the prediction accuracy rate of the first network event is less than a threshold.

15. The apparatus of claim 10, wherein the instructions further cause the processor to be configured to:
   determine a prediction result of the first network event according to the predicted occurrence probability, wherein the prediction result of the first network event represents whether the first network event is to occur;
   obtain an actual result of the occurrence of the first network event representing whether the first network event actually occurs;
   determine a prediction accuracy rate of the first network event according to the prediction result and the actual result; and
   update the second supervised prediction model when the prediction accuracy rate of the first network event is less than a threshold.

16. The apparatus of claim 10, wherein the instructions further cause the processor to be configured to:
   determine a prediction result of the first network event according to the predicted occurrence probability, wherein the prediction result represents whether the first network event is to occur;
   obtain an actual result of the occurrence of the first network event representing whether the first network event actually occurs;
   determine a prediction accuracy rate of the first network event according to the prediction result of the first network event and the actual result of the occurrence of the first network event; and
   update the first supervised prediction model and the second supervised prediction model when the prediction accuracy rate of the first network event is less than a threshold.

17. The apparatus of claim 10, wherein the timestamp comprises a start time of signaling transmission.

18. The apparatus of claim 10, wherein the timestamp comprises an end time of signaling transmission.

19. The apparatus of claim 10, wherein the signaling data comprises an access network type.

20. The apparatus of claim 10, wherein the signaling data comprises an attachment success mark.

* * * * *